US008613385B1

(12) United States Patent
Hulet et al.

(10) Patent No.: US 8,613,385 B1
(45) Date of Patent: Dec. 24, 2013

(54) AUDIO-VISUAL ENTERTAINMENT SYSTEM AND DOCKING SYSTEMS ASSOCIATED THEREWITH

(75) Inventors: Glade L. Hulet, Spanish Fork, UT (US);
Morgan D. Warner, Payson, UT (US);
William J. Boyer, Lakewood, WA (US)

(73) Assignee: Digecor I.P. and Assets Pty. Ltd., West End, Queensland (AU)

( * ) Notice: Subject to any disclaimer, the term of this patent is extended or adjusted under 35 U.S.C. 154(b) by 0 days.

(21) Appl. No.: 13/152,248

(22) Filed: Jun. 2, 2011

(51) Int. Cl.
*G06K 7/00* (2006.01)
(52) U.S. Cl.
USPC .......................................... 235/375; 235/380
(58) Field of Classification Search
USPC .................................................. 235/375–385
See application file for complete search history.

(56) References Cited

U.S. PATENT DOCUMENTS

2010/0063891 A1*  3/2010  Townsend et al. .............. 705/26
2010/0067884 A1*  3/2010  Schedivy ....................... 386/125
2010/0138581 A1*  6/2010  Bird et al. ...................... 710/303

* cited by examiner

*Primary Examiner* — Michael G Lee
*Assistant Examiner* — Matthew Mikels
(74) *Attorney, Agent, or Firm* — Van Cott, Bagley, Cornwall & McCarthy P.C.

(57) ABSTRACT

A docking system is provided and configured to receive swappable media players. Docking stations provide location-dependent information that the swappable media players may utilize to determine access permissions with respect to content stored on, or otherwise accessible to, the media players. Such content may include media content, product request/order applications, and the like. The location-dependent information may be obtained by the media player from docking station, after which the media player restricts or allows access to certain content based on the location-dependent information. A docking system may be used on an aircraft and can provide location-dependent information based on the location of a docking station relative to a seat, cabin, or other compartment. A cable-less connection may be used between the docking station and media player, which connector may float. A plenum provided along one or more surfaces of the media player allows airflow to cool the media player.

23 Claims, 10 Drawing Sheets

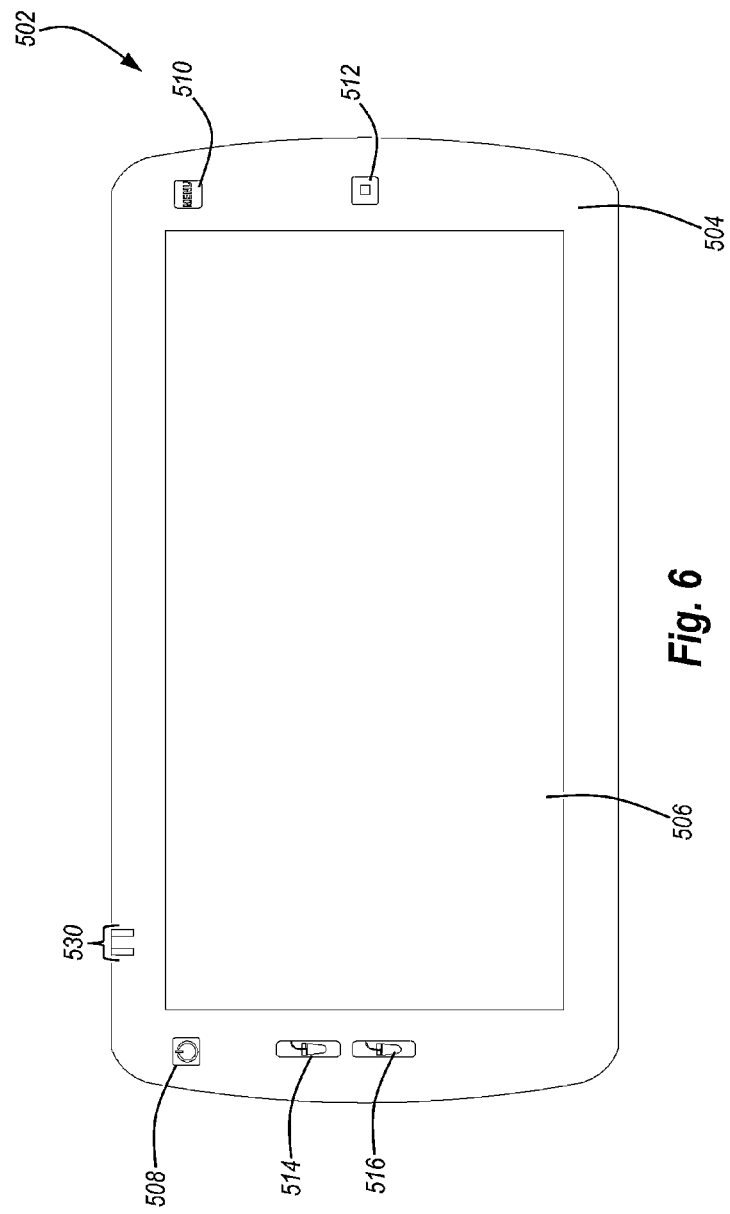
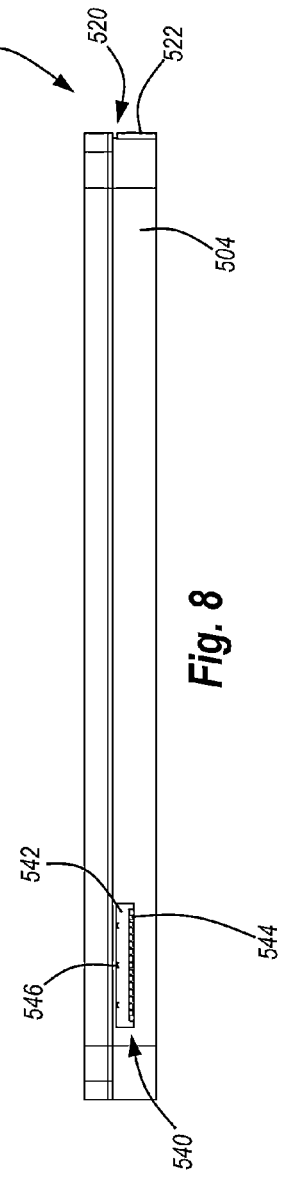

AUDIO-VISUAL ENTERTAINMENT SYSTEM AND DOCKING SYSTEMS ASSOCIATED THEREWITH

CROSS-REFERENCE TO RELATED APPLICATIONS

This application is related to U.S. patent application Ser. No. 10/737,531, filed on Dec. 15, 2003 and titled "DETACHABLE SEAT MOUNTED-AUDIO-VISUAL ENTERTAINMENT SYSTEM WITH LOCALLY STORABLE, SELECTABLE, AND UPDATABLE CONTENT," which application is expressly incorporated herein by this reference in its entirety.

TECHNICAL FIELD

The present disclosure relates generally to individualized entertainment devices for end-users within structures. In one aspect, embodiments of the present disclosure may be applied to placing individualized entertainment devices in an embedded or semi-embedded state within a movable or static structure. According to some embodiments, individualized entertainment devices may be utilized in connection with a transport system such as a passenger aircraft for in-flight informational, movie, gaming, music, food order applications, or for other purposes. In some embodiments, individualized entertainment devices may be utilized in connection with static structures such as hotels, resorts, spas, commercial or residential structures or in other environments.

RELATED ART

Various types of equipment and systems have been used over the years in order to provide entertainment to passengers seated in transport vessels or systems such as aircraft, busses, and trains. For instance, some systems have provided fixed or drop-down monitors at specific locations—such as bulkheads—within the transport vessel. Typically, the same movie or other programming is provided to each monitor for all passengers to watch. The locations of such monitors may vary, but are often located overhead every three or four rows so as to provide a monitor small enough to avoid being overly intrusive, while also providing passengers with a picture close enough to view.

Other viewing systems also exist. For instance, some transport vessels have included overhead projection that provides a larger screen for all passengers to view. Often, whether a system includes multiple monitors or a single projection system, the passengers are provided with selectable audio channels. If the user desires to listen to the presented programming, they may tune to a particular channel, or may tune to other channels that provide alternative audio feeds such as music, foreign language programming, and the like.

More recently, transport systems such as aircraft have begun employing more individualized in-flight entertainment (IFE) systems and devices. For instance, dozens or even hundreds of personal IFE devices can be distributed throughout an aircraft. In one example, individualized IFE devices may be placed in seatbacks and/or armrests within one or more cabins of an aircraft so as to be viewable by a passenger seated within the aircraft. A passenger seated behind another passenger may, for instance, view an IFE device embedded in the seatback of the seat directly in front of such passenger. A passenger on a first row may view a device that extends from the armrest, or which is located at another location and available for viewing.

When IFE devices are installed at seatback, bulkhead, armrest, or other locations, such devices are typically bolted or otherwise rigidly attached to the aircraft in a manner that requires a technician with particular skills or tools to install or remove the devices. For example, if an IFE device becomes non-functional during flight, the device generally cannot be replaced until the flight lands and a trained service person replaces the device. When the service person is available to replace the device, they may still be delayed as specialized parts may be needed. For instance, a device installed in seatbacks may differ from those installed in armrests or bulkheads. Additionally, other devices may be installed for service personnel in galley, crew seating, or even pilot cabins. A dedicated media control system or public address system may be installed in a crew area. Such devices differ from the IFE device in the transport vessel and, if they fail, still other different and specific equipment must be procured in order to replace a non-functioning unit.

Thus, transport vessels, entertainment and/or media systems, or other structures or systems could benefit from audio-visual devices that are fungible, swappable, or otherwise interchangeable, or which otherwise may be easy to install or remove.

SUMMARY

Embodiments of the present disclosure relate generally to in-flight entertainment systems or other systems in which content, functions, or applications may be provided to a user of an electronic device. More particularly, embodiments relate to apparatus, systems, assemblies, and methods in which media players may be at least temporarily docked in any of a number of different docking stations within a structure such as an aircraft or other transport structure or a hotel, building, or other static structure.

In accordance with one embodiment, a universal docking system is disclosed and includes a plurality of media player docking stations. The plurality of media player docking stations may each be configured to receive any one media player from a plurality of fungible, swappable or otherwise interchangeable media players. A structure has an interior portion and the docking stations are installed at a plurality of locations within the structure. At least some of the docking stations are encoded with media player persona information dependent on a docking station location. In at least some aspects, some of the docking stations are configured to transfer persona information to installed media players. The persona information may be configured to instruct installed media players of their functional role at a corresponding receiving docking station location.

A structure of the present disclosure may include any number of types of structures. In one embodiment, the structure is an interior cabin of a vehicle such as an aircraft, bus, train, personal wheeled passenger vehicle, or marine vehicle. Furthermore, persona information may take any suitable form or be any of a number of different types of information. One type of information may include information specific to a location in a vehicle, such as the seat, row, compartment, or other location. Other persona information specific to the location may include information about a passenger at the location. Such information may include, for instance, the passenger's credit card information, and may be received before or after a media player is docked with the docking station.

In at least some embodiments, persona information is utilized to control what information, content, applications, features, functionality, or the like is presented to a user of the media player. For instance, based on location-dependent information, certain content may be restricted from being provided by a docked media player. Restrictions may limit passengers to basic content, premium content, non-crew content, and the like. Crew members utilizing a docked media player may be granted access to cabin entertainment, management and other passenger cabin control systems using a media player that is swappable with media players in passenger compartments.

An embodiment of a universal docking system may include multiple swappable media players and multiple docking stations. Each docking station may be configured to receive any one of the media players. A structure that has an interior portion may also be included and be configured to dock the media players at various docking station locations. At least some of the docking stations may include a ducting surface that forms a plenum with a second ducting surface of a media player. The plenum may allow airflow to passively pass therethrough and cool the media players when only one surface of the media players is substantially exposed.

In some embodiments, the ducting surfaces, or other surfaces, may also provide guide surfaces that guide the media player into a position relative to a corresponding docking station. At the docking station, the docking station and media player may mate using a connector. The connector may float or otherwise move within a constrained region, and is optionally cable-less.

Embodiments of media players may take any of numerous forms. In some embodiments, swappable media players include touch-sensitive displays. Same or other embodiments may include cursor controls and/or selection mechanisms. In some cases, redundant selection mechanisms are provided such as where a touch-sensitive display is combined with movement and selection controls external to the display. The display may be sized for an area having limited available space. Such displays may be, for instance, between about seven and about ten inches along a diagonal.

In at least one embodiment, the docked media player includes a battery that is removable and/or remains attached while docked. One or more external charge indicators may also be provided. An input/output docking connector can connect to a connector of a corresponding docking station, and may facilitate transfer of data or other signals according to distinct communication protocols. A docking connector may include, for instance, any combination of ports or transfer for audio out, video out, video in, Ethernet, $I^2C$, one or more input discretes, power in, power out, or USB. Input controls on a device may include multiple movement and selection controls. Such controls may include those of a display and those separate from the display. A payment interface may also be integrated to read credit card information and at least temporarily store such information.

In at least one additional embodiment, a universal docking system provides a floating connector between a media player and docking station. A plurality of media player docking stations can each be configured to receive any media player from a plurality of swappable media players. A structure having an interior portion can be included and have locations for each of the docking stations. At least some docking stations may be configured to mate with a media player using a cable-less connector that floats within a constrained region provided by the docking station and/or media player.

Other aspects, as well as the features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 6 is a front plan view that illustrates the portable media player of FIG. 3;

FIG. 8 is a bottom plan view that illustrates the portable media player of FIG. 3, having a connector for use with a docking station port;

DETAILED DESCRIPTION

Aspects of the present disclosure relate generally to media players configured for use in any of numerous environments, to provide any number of types of media or content, or which otherwise provide a computing component for input or output purposes. By way of example and not limitation, such media players may be used as an in-flight entertainment (IFE) device that provides audio and/or visual output directed to one or more passengers of an aircraft. It should be appreciated, however, that embodiments of the present disclosure are not limited to use in an airline or any other vehicle, or even as an entertainment device. In an aircraft, the device may also be usable by airline employees. Such employees may use a media player to control one or more aircraft passenger cabin systems (e.g., entertainment systems, food/drink order systems, public address system, seat-belt alert systems, entertainment override systems, etc.), to take food, snack, drink, headphone, or other orders, or for any number of other purposes. In other embodiments, an IFE may be used in other passenger vehicles, such as busses, trains, marine, or even personal vehicles. Accordingly, an IFE or media player of the present disclosure should not be limited to any particular industry, vehicle, use, or the like, unless expressly limited in the appended claims. Other example non-mobile and/or non-transport environments in which an IFE or media player may be utilized include hotels, resorts, spas, theatres, athletic venues, buildings, and the like. While an IFE may be referred to herein as a "media player," such designation is used to represent any number of different types of electronic devices, and need not be limited to a device that presents audio and/or video content. Media players may include various devices as described herein, or as may be learned from a review of the description herein, including dedicated media devices, media devices installed in a particular environment, smart phones, tablet computing devices, e-readers, gaming consoles, other personal electronic devices, or any combination of the foregoing.

Figure 1:
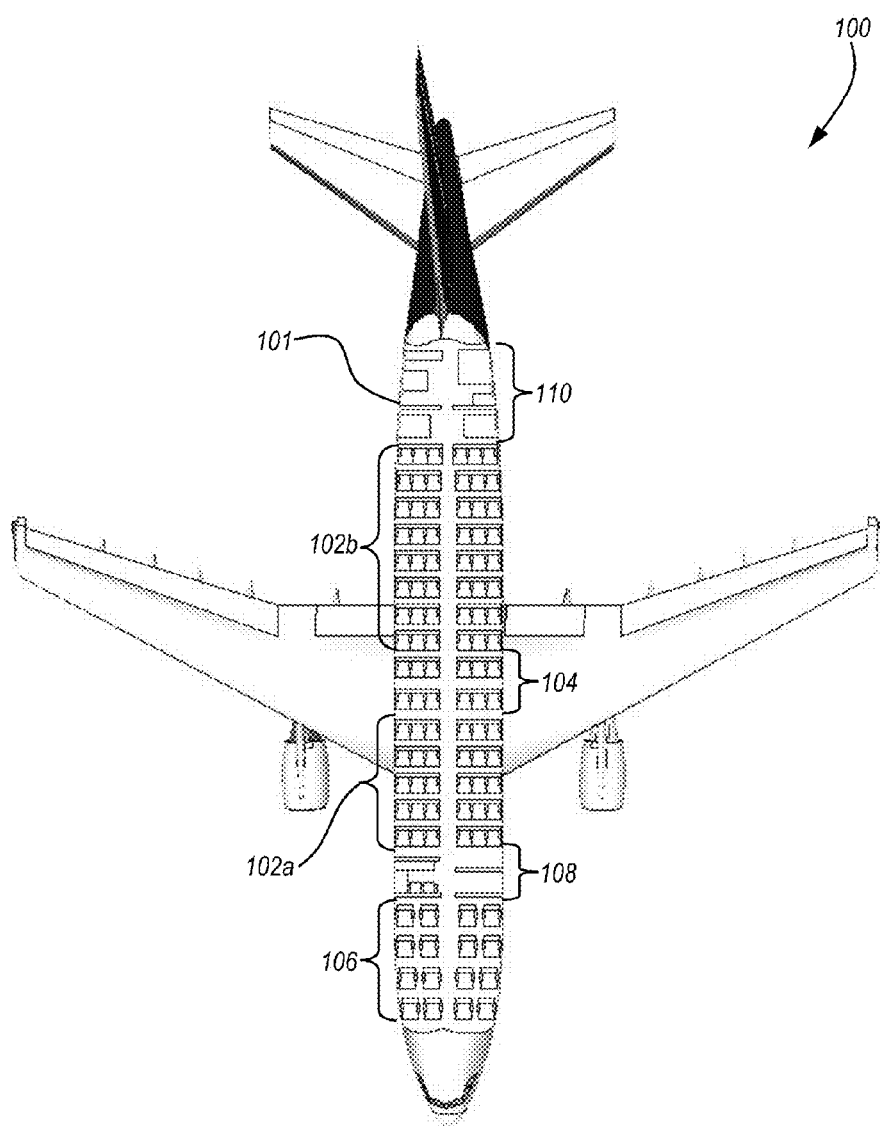
FIG. 1 is a partial cutaway view of a transport vessel including passenger seating.

FIG. 1 illustrates a transportation system 100 according to one embodiment of the present disclosure. As shown, the transportation system 100 may include a structure 101, which is illustrated in this embodiment in the form of a passenger vehicle that includes an aircraft cabin. According to some embodiments disclosed in greater detail herein, one or more locations within the structure 101 may include media players configured to provide output to, or receive input from, passengers or crew members within the structure 101.

More particularly, the illustrated embodiment illustrates the structure 101 being separable into multiple compartments or locations. In FIG. 1, for instance, the structure can be divided into six compartments or locations, although more or fewer compartments may be identified at any suitable granularity. Indeed, in some embodiments, each seat or other location within the structure 101 may be considered its own compartment or location. In the illustrated embodiment, however, the six compartments are illustrated on a more general scale. For instance, such structure 101 may include multiple passenger compartments 102-106 as well as multiple crew compartments 108-110.

The illustrated passenger compartments 102-106 and crew compartments 108-110 may serve different functions or purposes. For instance, an aircraft may include different classes of seating, such as coach, first class, business class, and the like. Moreover, seating within any such seating class may further be compartmentalized or varied. By way of illustration, exit row seating may exist within any particular seating class. In FIG. 1, a coach cabin may generally be represented by compartments 102a, 102b, and 104, while a first class or business class cabin may be represented by compartment 106. Moreover, in this embodiment, compartment 104 may represent exit row seating as a separate compartment or location within the structure 101. Crew compartments 108-110 may further be provided for any number of functions. For instance, compartment 108 or 110 may represent a kitchen area, storage, or cabin control area. From such compartments, the crew members within the structure 101 can retrieve and/or prepare food or snack items or possibly control aspects of the environment within the structure 101 (e.g., entertainment systems, cabin lighting, seatbelt alerts, oxygen systems, public address systems, etc.)

Identifying different compartments or other locations within the structure 101 may allow a media player according to some embodiments of the present disclosure to be utilized in any number of different manners, depending on the location of the media player. Thus, if a media player is used in a coach compartment 102a, 102b, the function of the media player may vary in at least some regard with respect to the same media player when placed in one or more of the first class compartment 104, exit rows 106, or crew compartments 108-110. In accordance with one particular aspect of the present disclosure, a media player may itself be removable from one location and replaced at another location within the structure 101, which can potentially automatically affect the function or use of such media player.

Accordingly, in accordance with at least one embodiment, media players and/or media players may be fungible with respect to any number of docking stations or media player locations within the structure 101. Thus, a media player may be swappable with a media player at another location, or with an extra media player stored within the structure 101 or retrieved from a location outside of the structure 101.

Figure 2:
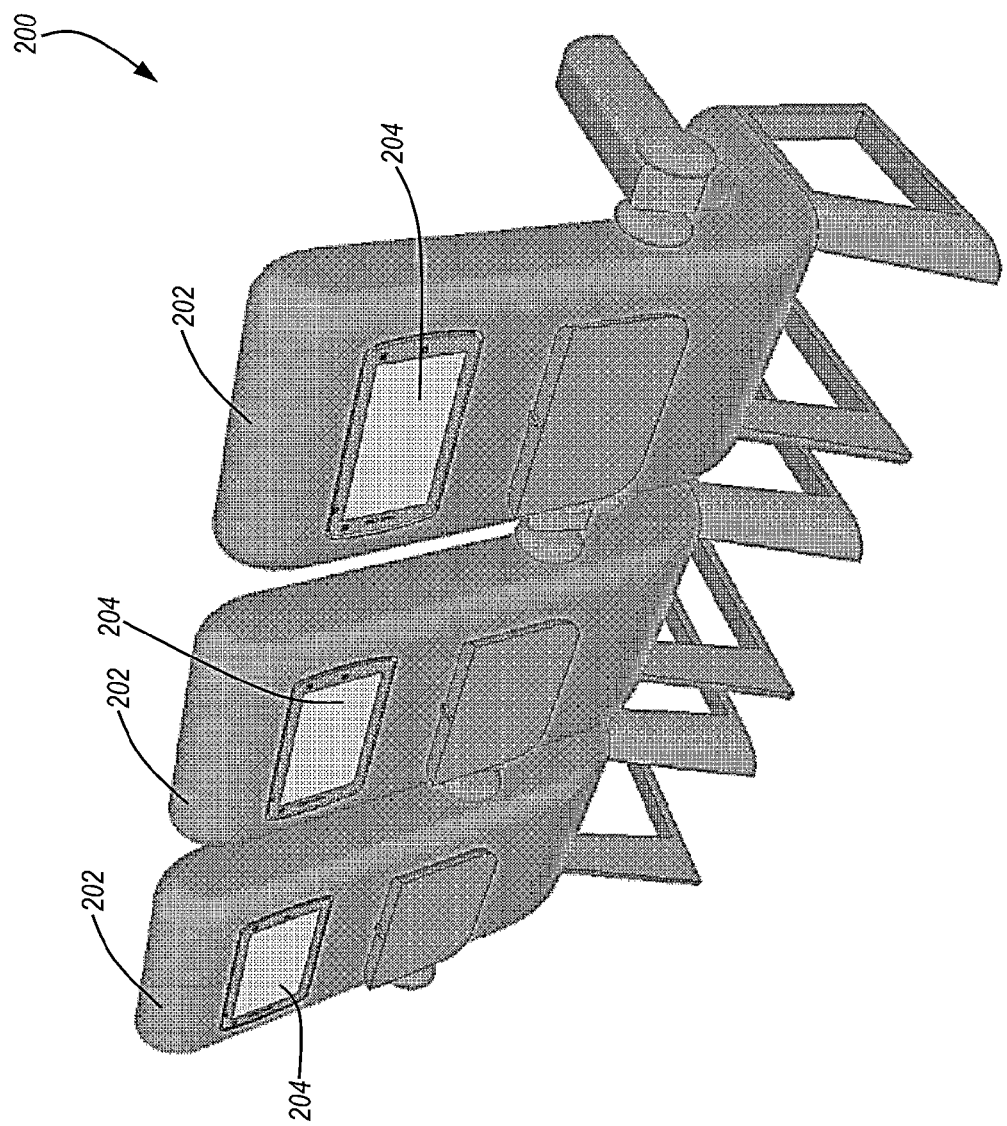
FIG. 2 is a perspective view of a row of passenger seats each having a media player installed in a headrest thereof.

As noted herein, by identifying various compartments within the structure, the functionality of a media player may be altered. FIG. 2, for instance, illustrates a row of seating 200 that may exist within the structure 101 of FIG. 1. In one embodiment, the row of seating 200 is within one of the coach compartments 102. As best seen in FIG. 2, such row of seating 200 may include multiple seats 202. Such seats 202 may represent an entire row across a cabin of a transportation vehicle, or a partial row. For instance, the seats 202 may collectively be positioned at one side of an aisle within the structure 101 of FIG. 1.

Each of the seats 202 is illustrated as including a media player 204 installed therein. In this embodiment, the media players 204 are installed in a headrest or seatback of the seats 202. Such placement is, however, merely an example, and in other embodiments, a media player 204 may be installed in other locations, such as an armrest, overhead position, bulkhead, or other location within the structure 101 (FIG. 1). Where the row of seating 200 is within a coach compartment 102 (FIG. 1), media players 204 may be configured to provide entertainment or functional options that differ from embodiments where the row of seating 200 is within another compartment. For instance, within a coach compartment 102 (FIG. 1), the media devices 204 may provide an entertainment package with a set of particular content that is locally stored on the media player 204, available over a network, or otherwise available. A passenger within an exit row compartment 104 (FIG. 1) may have additional or alternative programming. For instance, in at least one embodiment, a media player 204 within an exit row compartment may provide the same content as a media player 204 within a coach compartment, but also add additional content relative to safety or emergency protocols specifically relating to passengers within exit rows. In other passenger cabins, such as in a first class compartment, media players 204 may have still other content or functions available. The content available to media players 204 in the coach compartments may be a basic content package. In a first class compartment the media players 204 may make available premium or other content in addition to the basic content. Additionally, or alternatively, the fees associated with provided content may vary. For instance, even where media players 204 in coach and first class compartments provide the same content, the costs associated with such content may vary. In a first class compartment, for instance, some content may be available without additional charge, whereas a passenger in a coach compartment may be required to rent or pay for all or a portion of the same content.

Further, media players 204 docked, mounted, or otherwise located within crew compartments 108-110 (FIG. 1) may be configured to offer crew-based content and/or applications. For instance, in addition as an alternative to content available to passengers within passenger compartments, a media player 204 within a crew compartment may operate to receive and/or display drink or food orders, provide controls to a public address system, provide control of cabin audio or lighting systems, manage and/or override IFE systems in passenger compartments (e.g., cause display of promotional, safety, or other information on IFE devices), display text for crew members to read to the passengers as part of the initial takeoff procedures, or display information or control features related to other aircraft features.

As will be appreciated, one aspect of some embodiments of the present disclosure is that access to certain content can be restricted based at least in part on a location at which the media player 204 is docked or otherwise located. Thus, in the above example, a media player 204 within a passenger compartment may restrict access to crew related applications or content that may only be available to media players docked within crew compartments or which otherwise have an override in place (e.g., a crew member enters credentials to override location-dependent restrictions). Likewise a media player 204 docked in a coach compartment could restrict access to premium content that would be available to first class passengers in a first class compartment. A media player 204 in coach compartments may, however, also provide content or services not provided in other compartments. For instance, in a coach compartment, a content purchase or rental application may be provided whereas such application may be restricted in the first class compartment where such content may be available without a fee.

In the present disclosure, the term "content" is utilized broadly to represent information that may be displayed or provided by or via the media players described herein. Such "content" is not limited to any particular form or use, and may include any information stored or carried on computer readable media that can be conveyed to a user of the corresponding media player. Content can include information played to the user without user interaction, such as in the form of video, audio, or other presentation formats. By way of example, content in an aircraft setting may include data such as flight information, destination information, weather, moving location maps, airport layout information, and the like that may or may not include audio or video components. Alternatively, content can be interactive. Examples of interactive content include applications running on the corresponding media player, user interfaces, gaming programs or applications, messaging systems, passenger cabin management applications, or other applications or modules with which the passenger, crew member, or other user can interact.

The examples described herein may be provided in the context of an ecosystem of distinct electronic media players that collectively function within an aircraft; however, media players and/or location-dependent operation structures can also be applied to other types of ecosystems as well. For instance, media devices may be utilized in other transportation systems, or even in static systems such as buildings. A passenger vehicle may utilize embodiments of the present disclosure differently depending on the docking location. In driver-adjacent position, for instance, a media player may provide navigational information, traffic information, vehicle monitoring information, access to back-up camera feeds, and the like, whereas at a seatback, overhead, or other location, the media player may provide entertainment or other features. Within a building, a media player may operate differently depending on the room, floor, or other location where it is located or docked. On one floor of an office building, for instance, the device may provide content relevant to a particular tenant on that floor, whereas at another floor information of another tenant may be provided. In other locations, other functions such as building security, elevator operation, HVAC controls, and the like may be provided.

In still other aspects, media players such as those described herein may have still further options and be used in still other locations. For instance, media players according to embodiments of the present disclosure may be used in a hotel, car rental, restaurant, or other facility. By way of illustration, in a hotel, a room may include a docked or portable media player, or may include a wired or wireless connection for a personal electronic device (e.g., tablet computing device, smart phone, e-reader, etc.) as described in greater detail herein. Using such a device, a user may request a particular movie for display on the device or a separate screen. Additional functions may include viewing a list of local attractions, maps of the area, reserving tickets for nearby events, etc. In a more particular example application, a hotel may include an application for scheduling wake-up calls, a check-out application, and/or a room service application. The room-service application could, for instance, allow the user to request certain food, souvenir, concierge, or other items, or schedule a time for the room to be cleaned. Using a network or other mode of communication, the media device may transfer such information to a corresponding computing device of hotel staff so that suitable food, scheduling, or other arrangements can be made.

Figure 3:
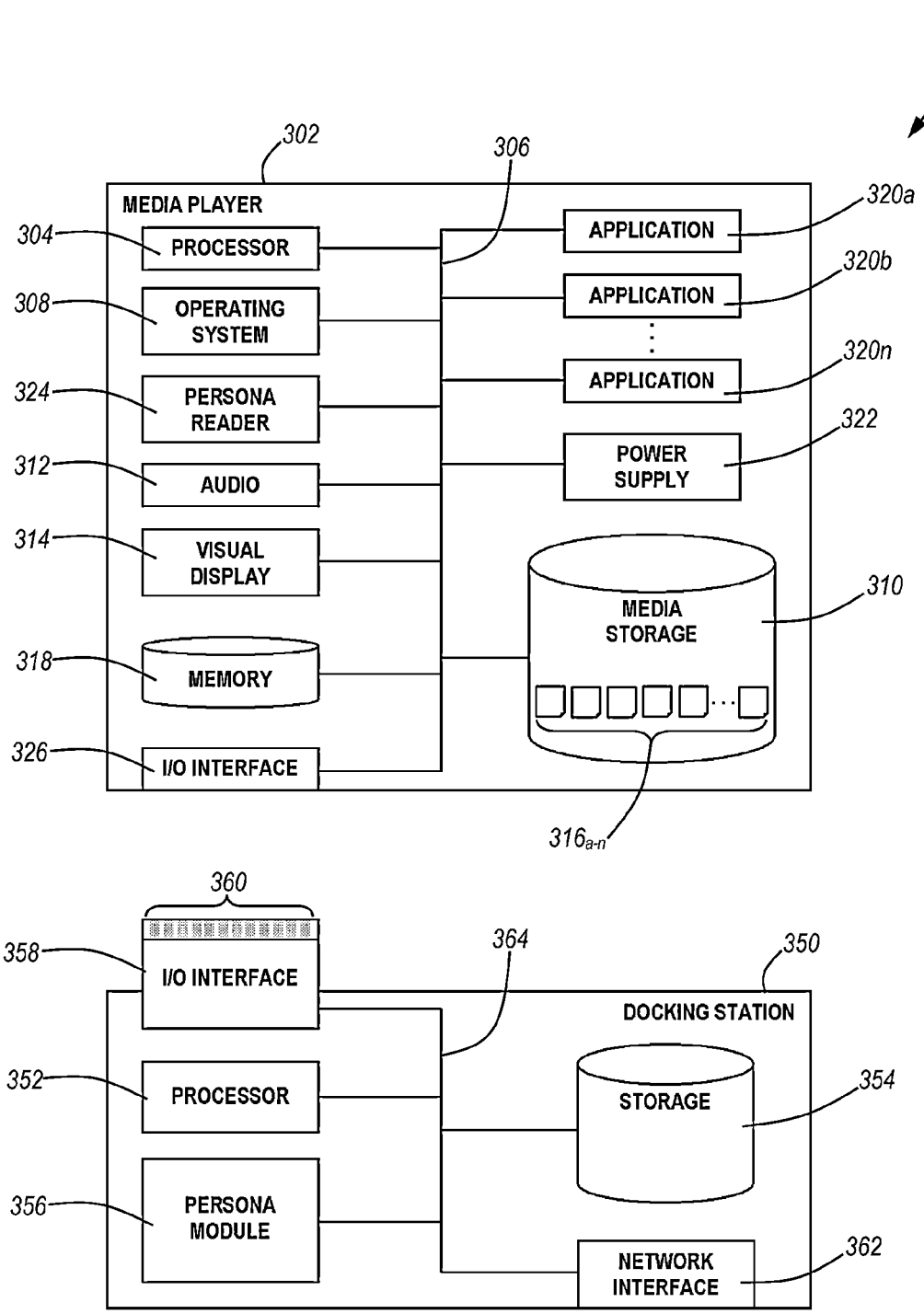
FIG. 3 schematically illustrates a media player docking system according to an example embodiment of the present disclosure.

Turning now to FIG. 3, an example embodiment of a media player docking system 300 that may provide content according to location-specific information is disclosed in additional detail. In accordance with at least one embodiment, the media player docking system 300 includes a media player 302 that may be docked with a docking station 350. As shown in FIG. 3, an example media player 302 may include any number of different components or features, only some of which are illustrated. For instance, a media player 302 may include a processor 304 that communicates with other components of the media player 302 using a bus 306. In general, the bus 306 provides a communication channel among various components and modules of the media player 302.

The processor 304 may execute computer executable instructions stored by, or accessible to, the media player 302 and facilitate operation of the media player 302 as an entertainment, content, or service provider, or to restrict access to content based on persona information. An operating system 308 may be included on the media player 302 (e.g., in computer-executable instructions stored on a storage device such as a hard drive, solid state drive, memory device, and the like). The processor 304 and/or operating system 308 may further operate to obtain content (e.g., from media storage 310), and provide such content using an audio system 312 and/or visual display 314 of the media player 302. In addition to media content, the audio system 312 and/or visual display 314 may be used to allow a user to interface with the media player 304. For instance, the visual display 314 may include a touch-sensitive display and operate as an input or control system. In other embodiments, a separate input or control system may be used. Additional or alternative input and control systems may take any suitable form, including control buttons on the media player 302, a mouse, keyboard, game control, remote control, or other type of input or control device that provides input/output functions. Further, although a single audio system 312 and display 314 are illustrated, such is merely an example. In other embodiments, for instance, there may be multiple audio systems 312 (e.g., providing dual audio outputs, etc.) or multiple display screens, a video out port, or other devices to present image, video, or other visual data. In FIG. 3, the content or information presented using audio or visual means may take the form of content 316*a-n* stored in media storage 310, although content may originate from other locations local or external relative to the media player 302.

As shown in FIG. 3, the media player 302 may also include other features or aspects. For instance, the processor 304 may communicate with memory 318 and one or more applications 320a-n. The applications 320a-n represent any number of different types of applications or programs that may be run by the media player 304. For instance, the applications 320a-n may include applications associated with: displaying images; playing video or audio files; presenting customer surveys; accepting payments; providing video games; providing navigational information; controlling lighting; sending or receiving food, drink or other orders; requesting assistance from crew members (e.g., blanket, headphone, pillow, or other request); managing in-flight communications from the crew to passengers, from the passengers to the crew, or from passengers to other passengers, reserving airline, rental car, or hotel rooms; surfing the Internet; or other functions, or any combination of the foregoing. By way of illustration, in one non-limiting aspect of the present disclosure, the applications 320a-n may include flight attendant call features. For instance, rather than utilizing an overhead or other call button, an application running on the media player 302 can communicate through a wired or wireless network with a device accessible to a flight attendant and optionally also a media player 302. When calling the attendant, information such as the user's name, seat number, and the like may be provided. Additional aspects consistent therewith may include the ability for the user to provide notes to indicate why the call feature is being activated (e.g., a food or snack order is being sent, a blanket or pillow is requested, headphones are needed, etc.). Such information can be typed or possibly selected from a list. In some aspects, one or more call features may have their own respective applications. For instance, a food/snack order system may operate independent of a generic flight attendant call system.

When the processor 304 executes an application 320a-n and/or accesses content 316a-n, the media player 304 may store all or a portion of the applications 320a-n, content 316a-n, inputs received from a user, information accessed from another source, or other information within the memory 318. The memory 318 may take any form and may include, for instance, volatile or non-volatile memory, or may include any other suitable computer readable storage media. In some embodiments, the memory 318 and media storage 310 may be combined into a single storage device. Other components of the media player 302, while illustrated as separate components, may also be combined.

The capacity of the memory 318 and/or storage 310 may vary as desired. For instance, where the media player 302 may be used universally in a number of different locations or docking stations, and optionally with different content permissions based on location-dependent information, a larger capacity may be utilized to store increased content and an increased number of applications, programs, and the like. In some embodiments, the capacity of memory 318 and/or storage 310 may exceed 25 Gigabytes, although the capacity may be greater or smaller. In some embodiments, the capacity may exceed 100, 500, or even 2500 Gigabytes. The media player 302 also includes, in some embodiments, an internal power supply 322. The power supply 322 may include, for instance, one or more batteries that are optionally rechargeable and/or removable.

As discussed herein, a functional aspect of some embodiments of media players 302 according to the present disclosure is that the operation, available functions, content, or other features of the media player 302 may be dependent on location-specific information. Accordingly, in some embodiments, the media player 302 includes a persona reader 324.

The persona reader 324 may be responsible for storing location information, accessing location information, otherwise determining location information that may be relevant to the operation of the media player 302, and adjusting content access based on the location information.

In some embodiments, the media player 302 may be a stand-alone, self-contained device that may be operated without external physical, wireless, or other connections to other systems. In other embodiments, the media player 302 may be connected to one or more other components of a network or system 300. In still other embodiments, the media player 302 may be configured to selectively operate in both self-contained and networked modes. To facilitate communication when operating in a system 300, the media player 304 of FIG. 3 includes an input/output interface 326. The input/output interface 326 may take any suitable form. For instance, the input/output interface 326 may make use of physical, hardware connections (e.g., using a cable, connector, docking port, etc.) or wireless or other connections. Any combination of the foregoing may also be utilized.

The media player 302 may be fungible with respect to other media players that operate in one or more other locations. For instance, in the context of an aircraft, the media player 302 may be substantially the same as other media players regardless of whether operating in a coach compartment, first-class compartment, crew compartment, or other area. To facilitate the foregoing, the media player 302 may store or otherwise have access to all necessary content 316a-n and applications 320a-n required for all locations in the aircraft or other system. More particularly for an aircraft ecosystem having hundreds of media players 302, each may potentially store the same content 316a-n. Media players 302 installed in a crew compartment of an aircraft may provide access to crew related application or information, while media players 302 installed in seatbacks could provide passengers access to entertainment data while restricting access to crew-specific applications and information stored on the media player 302.

Where the media player 302 is fungible relative to other media players and can be used in various locations to provide location-dependent functions, content, applications, or the like, the media player 302 optionally obtains location-specific persona data from a source external to the media player 302. In at least some embodiments, the persona data may be supplied using a docking station 350 within the media player docking system 300.

The docking station 350 is a schematic representation of any number of particular implementations of a docking station that can be used in connection with the media player 302. In accordance with some example embodiments, the docking station 350 provides a physical connection to which the media player 302 may be at least temporarily secured, such as by using a housing, physical connector, or other mechanism, or some combination of the foregoing. In other embodiments, the docking station 350 may include electrical or other components. For instance, the docking station 350 may include an optional processor 352, storage/memory 354, and/or a persona module 356. The docking station 350 of the illustrated embodiment may connect to the media player 302 using an input/output interface 358. More particularly, the input/output interfaces 326, 358 of the media player 302 and docking station 350, respectively, may be complementary to connect using physical or other means. In FIG. 3, for instance, the input/output interface 358 of the docking station 350 may include a set of pins 360 that may connect to corresponding receptors or other structures (not shown) of the input/output interface 326 of the media player 302. The docking station 350 may also include an optional network interface 362. The network interface 362 may be used to pass information to or from the media player 302. More particularly, the network interface 362 may connect to one or more server, head end, or other computing or electrical devices using a wireless, physical, or other connection mechanism. Such other device may pass information to the docking station 350 for routing to the media player 302. Alternatively, the media player 302 may pass information to the docking station 350 for passing to the server, head end unit, or other device.

As discussed herein, the docking station 350 may facilitate swapping of fungible media players 302 between multiple docking stations. In doing so, location-specific persona information may be utilized to impart to the media players 302 different functionality, roles, access permissions, or the like. In some embodiments, the docking station 350 is configured to transfer locally encoded or stored persona information to a media player 302 docked or otherwise mounted therewith. Generally speaking, the docking station 350 may not only provide a physical connection used to mount the media player 302 (e.g., to a seatback, armrest, bulkhead, etc.) and/or pass-through electrical connection to another network resource, but it may also enhance or supplement functional capabilities of a docked device. In the illustrated embodiment, for instance, the docking station 350 may include storage 354 providing access to additional resources, content, or the like. Additionally, the persona module 356 may provide information which can supplement or modify the behavior of the media player 302. In other embodiments, a docking station may provide enhanced capabilities in other regards (e.g., supplemental displays, audio speakers, user interface controls or functions, power resources, etc.).

The processor 352 may, in some embodiments, be configured to execute computer-readable instructions stored on storage 354 or persona module 356, or received through input/output interface 358 or network interface 362. Regardless of whether or not the processor 352 works in such a manner, however, the docking station 350 can be used to provide enhanced functionality or resources to the media player 302. In addition, the docking station 350 can exchange management data, or other information, with a remote server or other device as necessary, and regardless of whether instructed to do so by the media player 302. In one example embodiment, a server or other device can provide software or firmware updates. Such updates may be directed to the docking station 350 and/or pushed to the media player 302. Other updates for software and firmware may also be used. For instance, updates may be obtained using a pull method, such as where the docking station 350 and/or media player 302 request an update. The updates may be obtained from any suitable source. Suitable sources may include, for instance, a server. In other embodiments, updates may be provided in a peer-to-peer network, mesh network, or using another system or network topography. By way of illustration, multiple media players 302 may be installed in a particular ecosystem and one or more may be specifically used at some time to provide updates, or may operate as a more general IFE or other device while also being used to provide updates. In one embodiment, the media players 302 may operate as back-up system for software and/or content updates in the event a server is down. Multiple peer or other devices operating as a source for updates may thus provide higher availability and response time in pushing, pulling, or otherwise deploying content, software, or other updates.

In some cases, and regardless of whether an update includes software, content, or other updates, the media player 302 may not be docked with a docking station 350 at the time an update is provided. In some cases, the docking station 350 may include storage 352. The storage 352 may be used to store the update or to store a notice that the update is available. Consequently, when the media player 302 is docked, the media player 302 may receive the update directly from the docking station 350, or may receive the notice of an update and then request the update. Examples of the storage 354 include RAM, ROM, EEPROM, a hard disk drive, solid state storage, or other forms of computer readable media.

Where the docking station 350 can be used to provide persona information that can be used for location-specific functionality, the docking station 350 may be locally encoded with suitable persona information. Such information may dictate or instruct the media player 302 how to behave while docked with the docking station 350. The docking station 350 is considered to be locally encoded with persona information when such information is stored locally and in a persistent manner within, on, or in the docking station 350, rather than when such information is temporarily stored in a communications buffer or merely passed through the docking station 350 to the media player 302. In other embodiments, however, all or some persona information may be stored remotely such as on a server accessible through the network interface 362. A combination of the foregoing is possible. For instance, the docking station 350 may store a local address of the docking station while a server or other device includes instructions or information about that address. By way of example, a docking station 350 may store a local address such as a seat number "5B", and a server may include a table that indicates that "5B" corresponds to a particular compartment within a vehicle. Thus, persona information stored locally at the docking station 350 and remotely may collectively be provided or used to instruct a media player 302.

If persona information is locally encoded at the docking station 350, such information may be stored in a manner that persists with the docking station 350 across power cycles and without requiring updates, although updates may be performed as suitable (e.g., to change location identifiers or granularity, etc.). In at least some embodiments, a remote device—such as a server—can initially provide persona information to the docking station 350 (e.g., at installation or updating of the docking station 350). At such time, the docking station 350 may persistently store the persona information in storage 354 or in another suitable location, or within the persona module 356.

As discussed herein, persona information provided to the media player 302 may be location dependent. For instance, multiple docking stations 350 may be employed throughout one or more locations and used to create a media, entertainment, or other type of ecosystem. The persona information that is locally encoded in a docking station 350 can vary based on its corresponding location to ensure that the docked media player 302 provides the suitable content or functionality. In some cases, providing proper content or functionality includes restricting access to content, functions, applications, programs, etc. that are stored on the media player 302, the docking station 354, or at a remote source, and may be based on the specific location of the docking station 350.

The persona module 356 may carry the desired media player persona information for the docking station 350 by including one or more encodings. Such information can be used by any of a number of similar or identical media players 302 and can restrict or enable content, applications, or functions based on various granularities of location information. The content, functions, or applications may be restricted based on a geographical location of the docking station 350 (e.g., city, state, country, zip code, etc.), compartment within the structure (e.g., room, cabin, etc.), docking station installation location (e.g., overhead, seatback, armrest, wall, bulkhead, etc.), or even based on a position within a compartment (e.g., seat assignment, overhead position, exit row, etc.). It is also contemplated that content can be restricted or enabled based on the type or class of location where a docking station is located. By way of example, a media player 302 docked with a docking station 350 in an exit row of an aircraft can provide content relating to aiding others through the exit, while the exact same media player 302 installed in a non-exit row can restrict access to such content.

Sets of locations and access permissions associated with such locations can be arranged in any number of different manners by the persona module 356 and/or personal reader 324. Types of locations may, for instance, be stored within the media player 302 as a hierarchical or relational class structure of information or metadata. Such information may include information related to buildings, vehicles, office space, aircraft, personal vehicles, marine vehicles, busses, trains, or other structures, or any combination of the foregoing. In such an approach, content restrictions or permissions may be inherited from a parent location type, although in other embodiments inheritance is not utilized. For a media player in a vehicle, a class structure might have the generalized hierarchical class of vehicle type→compartment type→row type. Permissions for content can be inherited based on the location class structure, for example, the parent class location of "vehicle type" may have an associated "aircraft" value that permits access to some content on the media player 302. A class location of "coach" for the compartment type can inherit permissions from its aircraft parent and also grant permission to additional content on the media player 302. A row type of "exit row" may inherit permissions from both of its parents and enable the media player 302 to access content relevant to the exit row as well as any other non-restricted content.

The foregoing is merely one example of a scheme for persona information, which may be stored or used according to any desired scheme. Persona information may, for instance, be stored as a file or library, a raw binary encoding, a GUID, in accordance with a schema (e.g., XML), as programmatic instructions, or using other encodings. Regardless of the particular format, the persona information may instruct a media player as to a particular functional role or set of accessibility permissions to be applied at a location of the docking station 350. For instance, the persona reader 324 may utilize such persona information to determine which content, applications, information and functions should be displayed in a menu and/or user interface. Persona information is optionally independent of the particular person using the device or system 300. In other embodiments, persona information may include or attach to personal information such as a passenger's name assigned to a seat, payment information, or other information that could be used to instruct the media player 302 as to its content access permissions, and such persona information may be provided before or after a user begins using the media player 302.

After the media player 302 is docked at the docking station 350 and obtains the location-dependent persona information, the media player 302 can derive its functional role based on the location information and based on locally stored content, functionality, and applications. Accordingly, a functional role or access permissions of a media player 302 can change on static criteria such as a seat number, aircraft number, vehicle identification number, building address, etc., as well as on dynamic data such as a flight number, passenger name, GPS-determined geographical location, weather conditions, news events, current time, etc. Any such information may be specified using a lookup table, relational or hierarchical database, index, or other data structure.

The persona module 356 of the docking station 350 may also be removable, replaceable, and/or updateable to further enhance the uses and functionality of the docking system 300. For example, a docking station 350 could be physically replaced with another docking station 350. In other embodiments, the persona module 356 may be pluggable and can be unplugged from the docking station 350 and replaced with a new persona module or plugged into a new docking station. In such embodiments, the persona module 356 could be a replaceable flash or solid-state memory device such as a memory stick, secure digital card, multi-media card, USB thumb drive, other flash device, or any other suitable device or a combination of the foregoing. In an example in which the persona module 356 is removable (e.g. a thumb drive, secure digital card, etc.), updates may be made to the module 356 in a secure manner. For instance, authorized personnel (e.g., airline staff, hotel maintenance, IT administrator, etc.) may remove or otherwise update the persona module 356. In some embodiments however, the persona module 356 may be updated by an end user by removing and updating the device. The user may, for instance, connect the persona module 356 to a personal electronic device, laptop, or other computing device. Such device may run an application that can update the persona module 356. In other embodiments, the persona module 356 may be updated by the end-user even without removing the persona module 356 from the docking station 350. For instance, the docking station 350 may include a port through which external access is provided to a computing device. Updates to persona data and/or the persona module 356 may thus be provided in any number of ways and through any number of sources. Such sources may include, for instance, a server device passing persona module updates to the docking station 350, updates received from the media player 302, manual updates (e.g., updates input by flight crew, passengers, etc.), RFID tags, off-site updates (e.g., updates provided by removing the docking station), end-user updates, or in other manners, or any combination of the foregoing.

As reflected above, persona information may be tied to a location by, for instance, attaching to an end-user, passenger, or other person at a specified seat, room, or other location. In some embodiments, persona information may be supplied directly from the end user (e.g., manually, electronically using a personal computing device, etc.). In one embodiment, a user may maintain a list of personal information that can be used by the media player 302. A user may, for instance, at a home computer maintain a list of movies, music, or other media as a "favorites" or in another format. Additional information may be obtained from social media applications to see what pages, media, and the like a person follows. That information may be provided over a network to an airline, hotel, etc. and then automatically used to update the persona module 356 using the passenger manifest. Based on such information, the media player 302 may provide movie, music, application, game, or other programs that are included from the list of favorites. Optionally, an algorithm may also be used to predict other content the user may enjoy based on similarity to other programs identified. It should be appreciated that rather than using a home computer, a personal electronic device may also be used. For instance, a tablet PC, smart phone, or other device may run an application specific to an airline or supplier or manufacturer of the media player 302. Similar information about favorites, likes, dislikes, etc. may be provided and then that information can be uploaded to the persona module 356 and/or the media player 302. Such upload may take the form of removing the persona module 356 and performing an update, attaching the personal electronic device to an available input port provided by the docking station 350 or media player 302, using a wireless connection, or in another manner.

Any suitable encoding scheme or mechanism may thus be employed to locally encode the persona information of persona module 356 including optical encodings such as bar codes or OCR, magnetic encodings using one or more magnetic elements, or RFID tags. Yet other encoding schemes can include the use of one or more jumpers, a DIP switch, selectively populated components on a PCB, or other PCB configuration schemes. In some embodiments, persona information can be encoded in an encrypted format, while clear text may also be used in other embodiments. When encrypted, persona information can be stored using any suitable encryption scheme including DES, 3DES, AES, RSA, PGP, or other known or yet unknown schemes. Once properly authenticated, possibly by a key exchange or other protocol, the media player 302 can decrypt and access the persona information.

Further, rather than electronic or similar storage of persona information, persona information may be stored in the form of mechanical or physical representations. For example, the persona module 356 may include a series of one or more physical plastics, pins, wires, detents, holes, depressions, etc. Such physical encodings 330 may be arranged as a linear series, array, or in other arrangement that can be read by a media player 302, where width, length, size, presence, absence, depth, frequency, or other physical characteristics are used to encode the information. Furthermore, in some embodiments, characteristics of physical encodings could be adjusted mechanically or electronically to update the persona information, or the persona reader 324 of the media player 304 may be updated to associate physical encodings with different location-based roles.

While the persona module 356, storage 354 and input/output interface 358 are illustrated as being separate components, one or more of such components may be combined in other embodiments. For instance, the storage 354 or input/output interface 358 may be included within, or attached to, the persona module 356, or vice versa. The persona module 356 may also include computer readable memory or other storage that electronically stores the persona information in a persistent manner, in a removable manner, or in another manner, or in any combination of the foregoing. The input/output interface 358 or another interface may connect to the storage 354 through a bus 364 or in another manner to allow persona information to be written or read, or can possibly directly connect to an input/output interface 326 that operates as a connector for the media player 302. The input/output interface 358, or any other interface, can be a wired, wireless, or other type of interface.

Figure 4:
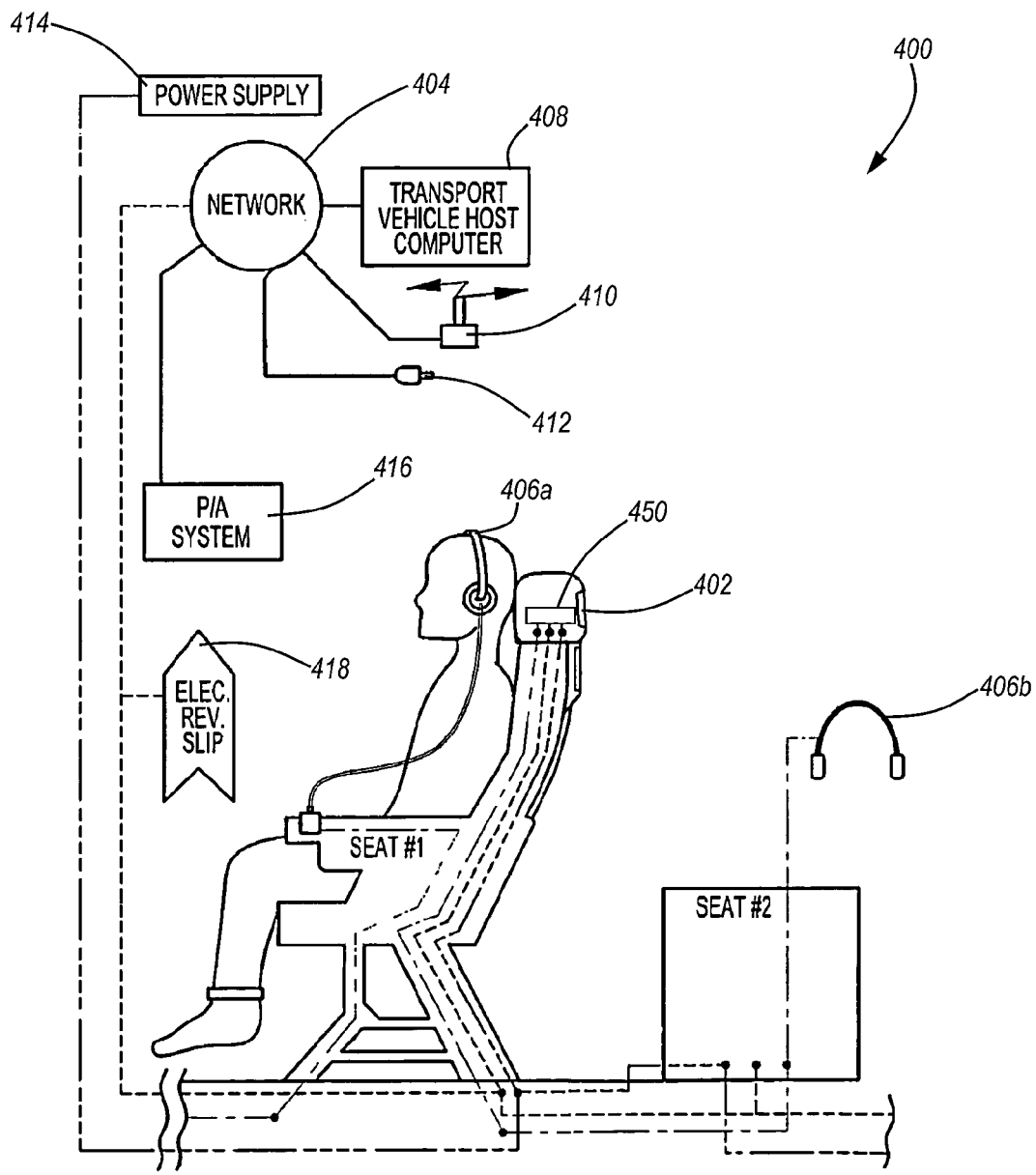
FIG. 4 is a diagrammatic illustration of various components of a media entertainment system that includes a media player and docking station optionally connected to a network.

In accordance with other aspects of the present disclosure, communications between the docking station 350 and the media player 302, or between another device (e.g., a server) and the docking station 350 and/or the media player 302, may occur in a secure, cryptographic, or other algorithm. By way of illustration, when the media player 302 is docked with the docking station 350, the media player 302 and/or the docking station 350 may initiate an authentication system (either with each other or with a server). Such authentication may include any suitable type of authentication scheme. For instance, a key establishment method may be used where cryptographic keys (e.g., public and/or private keys) are exchanged. Such keys may require a cipher or other mechanism that, when received allows the various devices to authenticate the sending device. When a server, for instance, receives a cryptographic key from a media player 502, the server may decrypt the key to determine that the media player 302 has authority or the capability to provide all or particular types of available content. After the media player 302 has been authenticated, the server may then send such content. In reverse, the media player 302 may receive and decrypt a key received from the server and/or docking station 350. After such key is received, if valid, the media player 302 may accept received content. The manner of exchanging keys or otherwise authenticating may vary as necessary. In one example, for instance, a media player 302 and/or docking station 350 may include a secure, tamper-resistant module. Such module may, for instance, include or be a part of, the memory 318. During authentication, the media player 302 may hash all or a portion of the memory 318 and send the same to the docking station 350, a server, another media player, or some other device. The receiving device may be aware of the contents of the tamper-resistant portion of the memory 318 or the result of the hash function, such that when the hash is received it can be compared to a known value. If the comparison indicates the media player has not been tampered with, the media player 302 may be authenticated for content, software, application, or other features. If device authentication fails, the device may not be provided content, a black-list may be created to restrict the device from future use, an automatic notification may be sent to an administrator (e.g., IT department, aircraft crew member, etc.), or the device may be provided an update or other software that restricts or tracks future access request As noted previously, a suitable docking station and/or media player may be incorporated within a larger ecosystem that optionally includes other docking stations, media players, or network components. FIG. 4 illustrates one example ecosystem 400 in which a media player 402 is docked with a docking station 450 and connected to one or more other components using a network 404. The media player 402 and docking station 450 may include or be consistent with any media players or docking stations disclosed or contemplated herein.

In the illustrated embodiment, the media player 402 may represent a passenger terminal that optionally includes locally or network storable, selectable, and/or updatable content. The media player 402 may have, for instance, a visual display, content storage, processing capabilities, and the like. In some embodiments, the media player 402 includes audio capabilities that may be directed to one or more audio outputs 406. In FIG. 4, for instance, a single media player 402 may go to two or more audio outputs 406a, 406b at different seats or locations.

Using the docking station 450, the media player 402 may be associated with persona information specific to the location of the first and/or second seats, may be securely held in place to withstand vibrations or impacts within the vehicle, or a combination of the foregoing. The media player 402 may also provide the passenger with audio and/or visual content in the form of movies, music, games, information, and the like, and such information may be selectable by the passenger.

In some embodiments, the docking station 450 is configured to connect to the network 404. For instance, in FIG. 4, the docking station 450 uses a set of wire, fiber optic or other connections that may be routed to the network 404 and optionally to a host computer 408 connected to the network 404, although wireless connections may be used in some embodiments. The host computer 408 may be a local server or computer. In an aircraft, for instance, the host computer 408 may be located on the aircraft and be used to control or manage one or more functions typically controlled by crew members, such as lighting, HVAC, entertainment, or other systems within the aircraft passenger cabin. By way of example, the host computer 408 may coordinate activities of the ecosystem 400, such as monitoring, managing, or maintaining the health of the system 400. The host computer 408 may also support other functions such as providing firmware or software updates to docking stations 450 or media players 402, updating content on media players 402, bridging communication between multiple media players 402 (e.g., for a passenger-to-passenger or passenger-to-crew messaging application, multi-player game, etc.), controlling the public address system, controlling galley/cabin lighting, setting seat-belt or oxygen warnings, and the like. Accordingly, in some cases, the host computer 408 may be another media player 402 docked in an appropriate docking station 450 with corresponding persona information.

While the host computer 408 is illustrated as being local within the ecosystem 408, in other embodiments the host computer 408 may be remote or may connect to a remote system. For instance, the network 404 may include a wireless connector 410 or a wired connector 412 to connect to a separate, and optionally remote, computing device (not shown). It at least one embodiment, media players 402 may be able to obtain content from a remote source (e.g., connected to the wireless connector 410). For instance, a satellite feed of television programming may be available. Optionally, the ability to access such content is dependent on persona information utilized by the media player 402.

In some embodiments, a wire, fiber optic, or other similar connection between the docking station 450 and the network 404 may be eliminated or supplemented using a wireless connection such as a wireless local network. Such a wireless network may include communications between the media player 402 and host computer 408, between the media player 402 and the docking station 450, between the docking station 450 and the host computer 408, or between any number of other components. A wireless local network may use any number of communication protocols, including Bluetooth, Infrared, 802.11, WIFI, RF, or other wireless-enabled protocols. In such a circumstance, the docking station 450 may retain some wire-type connections while wireless connections are also used. Wire connections may remain between the docking station 450 and the audio outputs 406, a power supply 414, or other components. Other connections may be wireless, including any or all connections with the network 404, the host computer 408, a public address system 416, a payment processing system, and the like. Accordingly, the network 404 may take any suitable form, including a packet switched network of switches, routers, hubs, docking stations, and the like. The network 250 may utilize any of a number of different protocols, including WiMAX, UWB, 802.11, RS-232, RS-485, Bluetooth, Zigbee, Z-Wave, CAN, Ethernet, TPv4, TPv6, UDP, TCP, HTTP, J1709, J1936, or other network or communication protocols.

Media devices 402 and docking stations 450 may have any suitable design or configuration enabling their use in the ecosystem 400. In some embodiments, for instance, the media devices 402 and/or docking stations 450 may be universal in nature. In such embodiments, the media devices 402 may be fungible so as to be universally accepted in any of the docking stations 450 within the ecosystem 400. The docking stations 450 may also be universal so as to receive any of the media devices 402 within the ecosystem 400, regardless of the particular location of the docking station 450 and/or the access permissions associated therewith. It should be appreciated in view of the disclosure herein that a docking station 450 may be universal without being identical to all docking stations in the ecosystem 400, and that a media player 402 may be universal without being identical to all media players in the ecosystem 400. For instance, a docking station in an aircraft may be at locations within a seatback, armrest, bulkhead, crew compartment, etc. that may necessitate or otherwise utilize different physical designs compared to docking stations at other locations. Regardless of the particular physical design, however, any of the media players 402 may be usable therewith. The media players, while including different content, software, etc. may also be universal as they can dock with any of the docking stations 450 despite changes to physical or software components.

It is also contemplated that in some embodiments the system 400 will accept and store or process payments received from a passenger or other user. By way of illustration, the media player 402 may include a payment interface such as a card swipe or proximity reader (see FIG. 5) for reading magnetic or other information encoded on a card or other device. The docking station 450 may be configured to receive payment information processed by the media player 402 and transmit such information via a wired or wireless connection to the network 404 or another device. An electronic revenue slip 418 may, for instance, be generated and passed through the network 404 for distribution to a payment processing center such as a credit card provider's host computing system. In some embodiments, the revenue slip 418 is routed realtime to the payment processing center. To facilitate such processing, the wireless connector 410 may include an antenna that uses satellite communication to connect to the Internet, another network, or directly to a payment processing center. Alternatively, the network 404 may store revenue slips 418 and transmit or otherwise transfer such slips 418 for processing at a later time, such as when an aircraft has landed. In such a case, the revenue slips 418 may be stored at the host computer 408 for batch processing. In still other embodiments, revenue slips 418 may be stored locally at the media device 402, docking station 450, or at other locations and subsequently processed one-at-a-time, or in a batch. For instance, the media player 402 may be removable from the passenger seat and include a communication port usable to retrieve stored revenue slips 418.

Turning now to FIGS. 5-8, an example universal and/or swappable media player 502 is illustrated and described in additional detail. It should be appreciated that the media player 502 is merely one example embodiment of a media player that may be utilized in connection with the systems described herein. Further, the media player 502 may include any and all features described elsewhere herein except where such features are expressly in conflict with those described relative to FIGS. 5-8.

Figure 5:
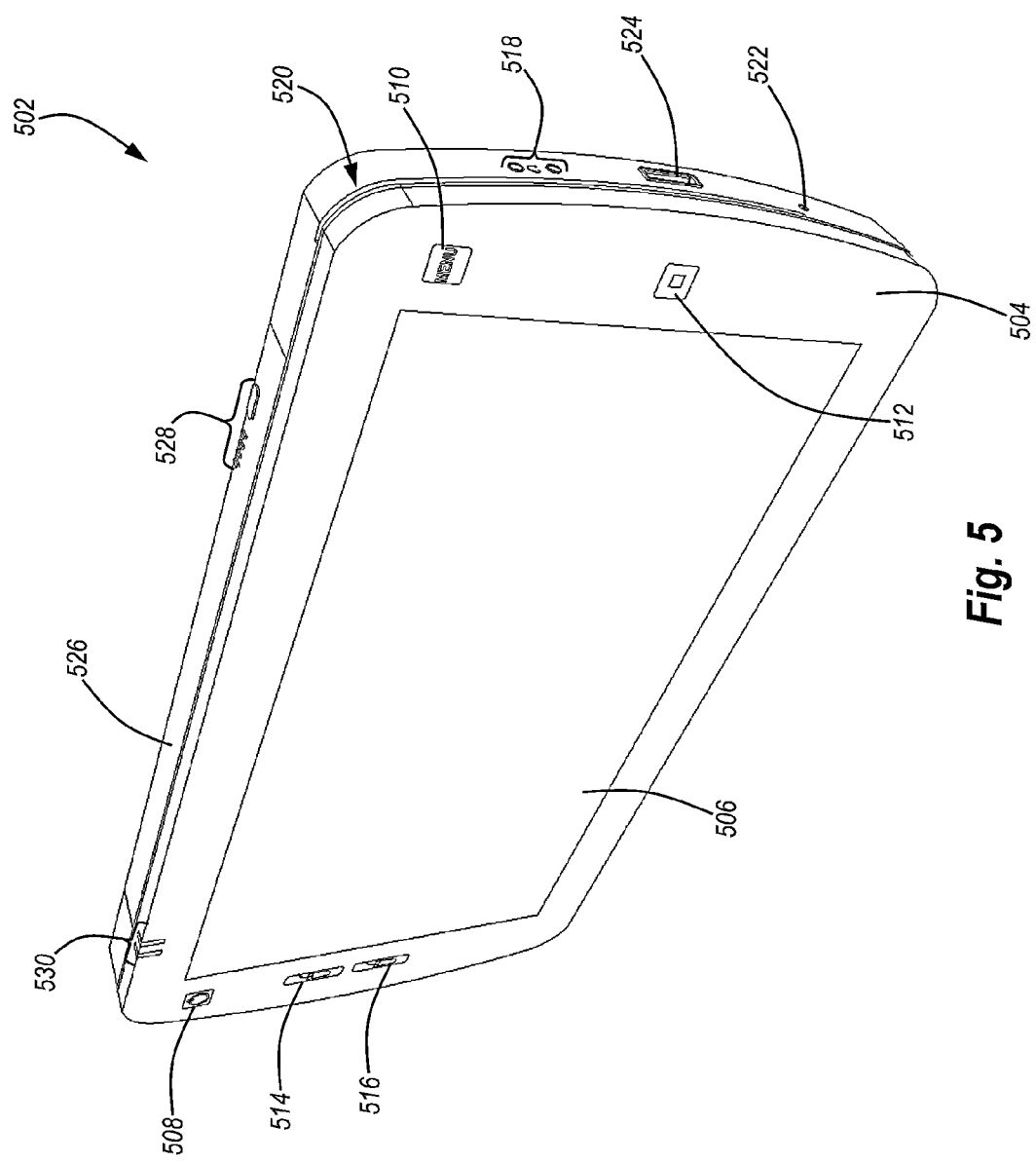
FIG. 5 is a perspective view that illustrates an embodiment of a portable media player.

FIGS. 5 and 6 illustrate respective perspective and frontal plan views of the media player 502, and depict various example features associated with a media player 502 of some embodiments of the present disclosure. The media player 502 may, for instance, include a housing assembly 504 which supports or includes a display device 506. The size of the display 506 may be varied as desired. In at least some embodiments, the media player 502 is sized to fit within a limited space such as a seatback or armrest, and the size of the display 506 is configured accordingly. For instance, the display 506 may have a diagonal size up to about seven inches. In other embodiments, the diagonal size of the display 506 may be up to about eight, ten, or even twenty inches, although the display 506 may be larger than twenty inches, or smaller than seven inches in some embodiments. Various user interface features (e.g., power control 508, menu control 510, cursor control 512, and selection controls 514, 516), content controls (e.g., play, stop, pause, forward, rewind, etc.), and audio/ visual controls (e.g., audio volume, display brightness or contrast, etc.) may also be provided by the media player 502.

In one embodiment, when a user depresses or touches the power control 508, the operating media player 502 may power up using a processor, operating system, and related components (see FIG. 3). In some embodiments, the media player 502 is a self-contained, stand-alone device that may access content (e.g., video, audio, informational, applications, games, etc.) stored on the media player 502. In other embodiments, the media player 502 may be configured to interact in a network or ecosystem, and optionally includes capabilities of accessing content based on location-dependent persona information. Identification and implementation of access permissions may be performed transparent to the user of the media device.

Upon determining what content or other information can be accessed by the user, and whether or not such determination involves accessing location-dependent persona information, information for selection may be provided using the display 506. For instance, a menu interface (not shown) may be presented and can allow the user to select between different content selections, categories of content or applications, and the like. The user may select the content in any suitable manner. For instance, in one embodiment, a user can touch the cursor control 512. Depending on the direction the user moves his or her finger, a cursor can move around the display 506. When the user has identified a particular selection, the user may use one of the selection controls 514, 516 to make the selection. In some embodiments, selection controls 514, 516 have functionality similar to left and right click functions on a standard computer mouse. Once a user has left the menu, the user may depress or touch the menu control 510 to return to a menu, home page, or other interface.

The controls 508-516 may operate using any number of mechanisms. In some embodiments, the controls 508 may be mechanical buttons that, when depressed, trigger an electronic signal that is processed by a processor. In other embodiments, the controls 508-516 may include resistive, capacitive, Infrared, optical, or other controls that do not necessarily require a mechanical depression. Such technology may simply allow a user to touch or place a finger or other component near a control 508-516 in order to recognize a user input. In additional or other embodiments, the display 506 may be configured as an input device. The display 506 may, for instance, be a resistive or capacitive touch screen. By moving one or more fingers, a stylus, or other devices around the screen, the user may move a cursor, select menu items, and the like. In some embodiments, the media player 502 includes both touch screen and cursor controls 512 for moving a cursor around the display 506.

When content is selected, such content optionally includes visual and/or audio aspects. Visual aspects of the content may be directed to the display 506, while audio aspects can be provided to an audio output. The media player 502 of FIG. 5 includes an audio output in the form of audio jacks 518. In this embodiment dual audio-output jacks 518 are provided and may enable two users to connect audio devices such as headphones to the media player 502 and retrieve audio content. Such jacks 518 may each provide sound in stereo or other quality. In other embodiments, each audio jack 518 may be a mono jack and a single user may connect to both audio jacks 518 to receive stereo sound. Optionally, sound volume or quality may be adjusted using the media player 502. For instance, the menu control 510 may cause the display of a menu that allows audio volume, balance, fade, and the like to be adjusted using touch-screen capabilities of the display 506 or the controls 512-516. Similarly, the menu can provide options to adjust video quality for the display 506, including the brightness, contrast, and the like.

As discussed herein, some content or all content available on the media player 502 may be available for a fee. Accordingly, in accordance with some embodiments, the media player 502 may include a payment interface 520. The payment interface 520 may include a card swipe, a proximity reader, or the like. The payment interface 520 may thus be used to read optical, magnetic, digital, or other information from a card or other device, and use such information to obtain payment for use of the media player 502 (e.g., as rental of the device) and/or access to content stored on the media player 502. Information that may be obtained includes a customer name, address, billing number, account number, and the like. In some embodiments, the customer's personal information may be associated with the location, such as where the user has a seat assignment in an aircraft. The customer's information may be used as persona data that instructs the media player 502 how to behave.

In an embodiment in which the media player 502 is self-contained, the media player 502 may use a power source. Any number of power sources may be provided. For instance, in one embodiment, power input jacks 522, 524 may be provided. In this embodiment, the power input jack 522 may take the form of a DC input, while the power input jack 524 may take the form of a USB or other input. Optionally, the jack 524 may be used as a data connection rather than as a power input. For instance, the jack 524 may connect to a USB or other cable that connects to a device that updates content stored on the media player 502, retrieves payment information stored on the media player 502, updates software/firmware of the media player 502, or provides any number of other functions.

Figure 7:
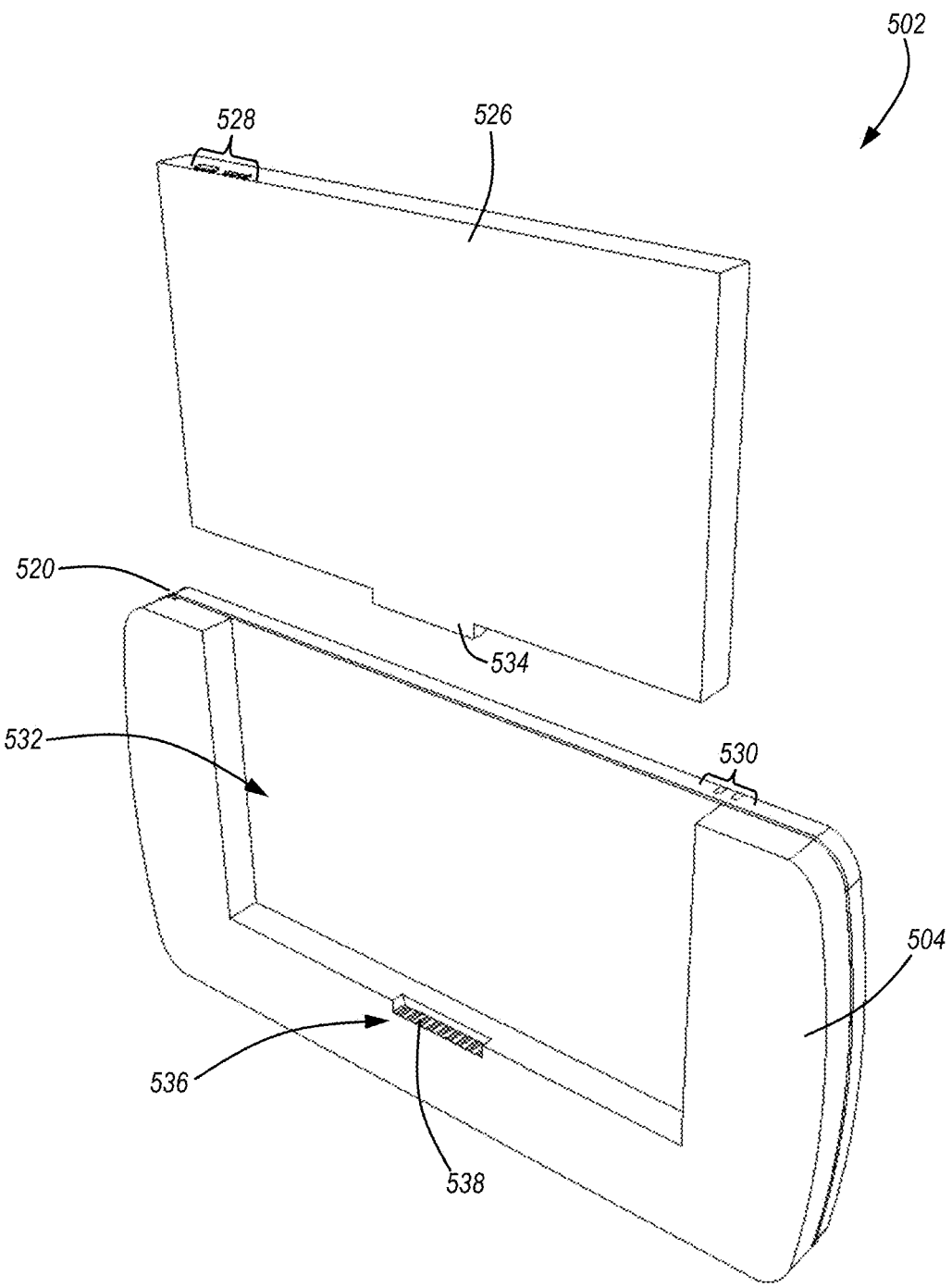
FIG. 7 is an exploded rear perspective view of the portable media player of FIG. 2, and illustrates a power supply separated from a housing of the portable media player.

In still other embodiments, and as best shown in FIGS. 5 and 7, the media player 502 may include a battery 526 used to power the media player 502. Optionally, the battery 526 is removable and/or rechargeable. For instance, in some embodiments, the media player 502 may include the battery 526 and other power inputs 522, 524. Where power is supplied through inputs 522, 524, the battery 526 may be left dormant and/or be charged. The battery 526 may also provide the primary power for the media player 502, such as where other power inputs 522, 524, if any, are not in use. Optionally, one or more indicators 528, 530 are provided to indicate the status of the battery and/or media player 502. For instance, the indicator 528 may represent the battery life or charge. One or more LED or other output devices may light up to indicate whether the battery 526 has a charge remaining, or the amount of charge remaining. For instance, if four lights provided, four lights may indicate a full charge, two lights may indicate about half of the charge remains, etc. The lights or other indicators may also indicate when the battery is active, being recharged, etc. Other indicators, such as indicator 530, may also represent the status of the battery 526 or device 502. For instance, when the media device 502 is powered on, one or more indicator lights may illuminate or turn on or turn a particular color. Multiple indicator lights or components may be provided to identify different states, including a powered on or off state, a charging state, a state reflecting the device is connected or disconnected relative to a network, a state reflecting the device is being updated, a state indicating that the media player 502 is in need of repair/replacement, or any other suitable state of the media player 502, battery 526 or a corresponding docking station.

In embodiments in which the media player 502 includes a battery 526, such battery 526 may take any suitable form or be physically and/or electronically coupled to the media player 502 in a number of different manners. For instance, removable alkaline batteries may be used. In other embodiments, lithium, lithium-ion, or other types of rechargeable or single-use batteries may be utilized. In FIG. 7, the illustrated battery 526 may generally conform to the shape of the housing 504, or otherwise be configured to connect to, and optionally nest at least partially within, the housing 504. To facilitate such a connection, the illustrated housing defines a receptacle 532 that generally has the size and shape of the battery 526. The battery 526 may thus be placed within the receptacle 532 and one or more releasable latches, clasps, or other mechanisms may be used to secure the battery 526 in place. In some embodiments, the battery 526 may be removed for use of the media player 502 with a docking station, and the docking station may connect using the receptacle 532.

As also shown in FIG. 7, when the battery 526 is placed within the receptacle 532, the battery 526 may establish an electrical connection with the media player 502. For instance, in this embodiment, the battery 526 includes one or more protrusions 534, although any suitable shape, design, or structure may be provided. Such protrusion 534 may mate with a corresponding depression 536 formed in the housing 504 and connected to the receptacle 532. One or more electrical connectors 538 may border the depression 536. For instance, the electrical connectors 538 may take the form of pins, wires or the like. Corresponding connectors (not shown) may exist on the protrusion 534. As a result, when the protrusion 534 is placed within the depression 536, connectors on the battery 526 may mate with electrical connectors 538 to establish an electrical connection through which power and/or data may flow.

As discussed herein, the media player 502 may operate in a self-contained or stand-alone mode. In other embodiments, however, the media player 502 may operate in a networked, docked, or system mode. To facilitate such a mode, the media player 502 may include one or more input/output ports configured to facilitate communication with other devices. For instance, the port 524 (FIG. 5) or the connector 536 for the battery 526 may provide network communication in some example embodiments.

Turning now to FIG. 8, a bottom-plan view of the media player of FIGS. 5-7 is illustrated and depicts an additional input/output port 540 that may be used in some embodiments of a media player 502. In the illustrated embodiment, the input/output port 540 may be configured to receive or otherwise couple to a connector from another device (e.g., a docking station). More particularly, in the illustrated embodiment, the input/output port 540 includes defines an aperture 542 into which one or more connectors 544, 546 may be positioned, although an input/output port need not include an aperture and may include projections or other features. Such connectors 544, 546 may further take any number of different forms. For instance, connector 544 may be a card or board including a set of pins, wires, contacts, or the like. Such pins or other contacts may be configured to mate with corresponding structures on a docking station or other connector and allow power and/or data to pass to or from the media player 502. The connectors 546 may provide a similar function. In some embodiments, the connectors 546 are formed or shaped to be resilient so that when a connector from an external device is connected to the media player 502 at the input/output port 540, the connectors 546 elastically deform. Such deformation may form a frictional fit to snugly retain the media player 502 connected to the peripheral device or connector. In additional or alternative embodiments, the connectors 544 or 546 may be used to electrically or mechanically detect when the media player 502 is connected to a peripheral device. In such case, a signal may be generated and used for any number of purposes, such as triggering obtaining and use of persona information, setting the indicator 530 to a particular state, or for any other function.

The input/output port 540 may take any suitable form, and may conform to any of a number of different standard or proprietary protocols. In some embodiments, the input/output port 540 is used to establish a connection conveying any number of different inputs and outputs between the media player 502 and an attached device. By way of illustration, the media player 502 may be configured to provide audio-visual information. In such an embodiment, the input/output port 540 may be a docking connector that is used to connect to a docking station that itself couples to an audio system, an external video display, a video input port, or another connector. For instance, in-seat speakers and/or a headphone connection system (e.g., with connections to jacks located on a passenger seat) may be provided. A passenger seat could also include a video input. A user of a portable electronic device, or other system, could potentially connect the video output of a personal device to the port on the seat or at another location, and the output can be routed to the media player 502 through a connection to the corresponding docking station. The input/output port 540 may thus include audio and/or video input and/or output components, although any other suitable feature or component may be provided. In some embodiments, the media player 502 may not include an internal power supply (e.g., when the battery is removed), in which case the input/output port 540 may provide for a power input. In case where the media player 502 does provide or connect to a power supply, the media player 502 may provide a power output. Such power output may be provided to a docking station, through a docking station, or in another manner.

In one example, a power out feature may be used to power an external docking station, a persona module, external audio speakers, in-seat electronics, other peripheral devices or accessories, or any combination of the foregoing. In one illustrative example, power output from the media player 502 may be received from a battery or other power supply and used to power a persona module or other aspect of a corresponding docking station such as those described herein. For instance, by providing power through the media player 502, in-seat or other wiring or control systems may be provided with lower complexity and higher reliability. In some aspects, the media player 502 may also transform power. As an example, power received at one voltage may be transformed to a lower or some other voltage. Thus, the media player 502 could, for instance, provide a power output with a transformed 5V, 3.3V, or other output.

The input/output port 540 may provide still other inputs or outputs corresponding to different protocols. For instance, the media player 502 may be equipped for network communication, and the input/output port 540 may include an Ethernet component. Other parallel or serial message communication protocols, including USB, I$^2$C, RS-232, RS-245, and the like may also be included. In still other embodiments, one or more input discretes may be provided. Such input discretes may be used to, for instance, receive a discrete signal for powering up the media player 502, pausing and/or overriding content displayed on the media player 502 (e.g., where an announcement is made via a public address system), or for other reasons. In some instances, input discretes operate in a hardware-centric manner that may have higher response time, reliability, simplified certification protocols, or other characteristics. In accordance with some aspects, hardware-centric input discretes may be replaced with software-centric controls or data. Other inputs may control aspects of the device, such as audio channel or volume. For instance, a passenger seat may have volume and/or channel selection interfaces, and adjustments using the interfaces may be directed to the media player 502 using, for example, USB, I²C, input discretes, or other inputs to the port 540. It should be appreciated in view of the disclosure herein that any number of inputs or outputs may thus be provided over a single input/output port 540, and that the input/output port 540 may simultaneously be used for any combination of different input and/or output components. In other embodiments, multiple input/output ports are provided to each carry one or more different components.

The media player 502 of FIGS. 5-8 is one example of a media player that may be used in accordance with embodiments of the present disclosure. Accordingly, the media player 502 may be universal, swappable, and/or fungible in accordance with certain devices or systems as described herein. Embodiments of the present disclosure should not, however, be limited to use of the media player 502 in accordance with systems or components described herein. In particular, the media player 502 is merely one example of a suitable media player for use with universal docking systems and/or location-dependent persona modules of the present disclosure.

Figure 9:
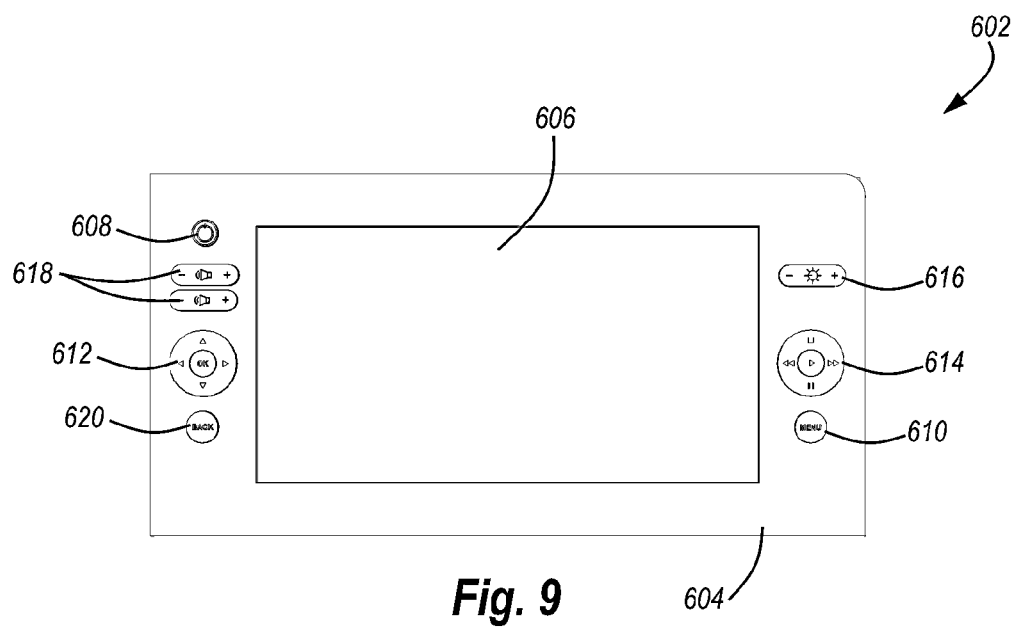
FIG. 9 is a front plan view of another example embodiment of a portable media player according to some embodiments of the present disclosure.
Figure 10:
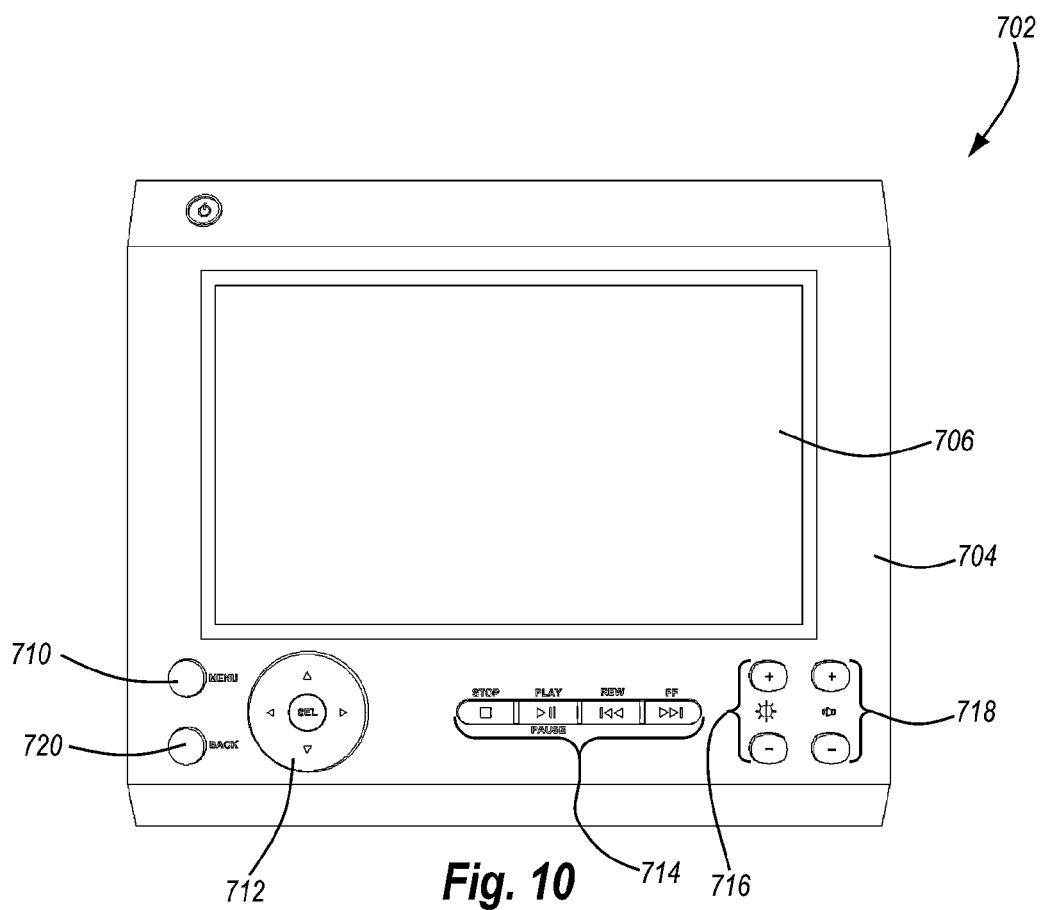
FIG. 10 is a front plan view of still another example embodiment of a portable media player according to some embodiments of the present disclosure.

FIGS. 9 and 10 illustrate other example embodiments of media players 602, 702, respectively, that may be utilized in connection with embodiments of the present disclosure. In general, the media players 602, 702 may include capabilities and/or functions similar in some regards to media player 502. Other aspects, however, may be varied. For instance, FIG. 9 illustrates an example media player 602 that includes a housing 604 and a display 606. The display 606 may be configured to display visual information stored on, or accessible to, the media player 602. In the illustrated embodiment, the media player 602 includes multiple interface controls 608-620 positioned outside the display 606 and within the housing 604. Such controls may include, for instance, a power control 608 and menu selection control 610 similar to controls discussed above relative to FIGS. 5-8. The media player 602 may also include cursor and/or selection controls 612. In this embodiment, such controls are integrated and can be depressed by a user. A user may move a control by pressing a circular or other control in a corresponding direction, and then selecting an item by depressing the center of the control 612.

Other controls may include content management controls 614. In this embodiment, as content is provided on the display 606, the user may control the content by playing, pausing, stopping, rewinding, or forwarding the content using the content management control 614. Such controls are not limited to visual content, however, and may be utilized for audio, informational, or other content. The forward or rewind controls may, for instance, change between pages of informational content. Other controls may include controls for adjusting display settings (e.g., controls 616), audio volume controls 618, and navigational controls (e.g., back control 620). Similar controls may also be provided in the media player of FIGS. 5-8; however, such controls may be displayed on a display, at a user's seat or location, or in another location rather than within the housing 604.

As shown in FIG. 9, the media player 602 may include controls generally positioned to the sides of the display 606. Such orientation may allow a device to have a footprint that is slightly taller than the display 606, while the width of the media player 602 is sufficiently larger so as to accommodate the added controls 608-620. In other embodiments, however, a media player may have controls in other positions or configurations for adjusting the shape of the media player. In FIG. 10, for instance, a media player 702 is illustrated and includes controls 708-720 with functions similar to those in FIG. 9. In such a device, however, the controls 708-720 may be located above and/or below the display 706 within the housing 704. As a result, the housing 704 may have a shape in which the width is optionally based on the display 706, while the height of the housing 704 is sufficiently large to accommodate the display and the controls 708-720.

While the foregoing primarily describes the use of media players that are dedicated for use with particular docking stations, it will be appreciated in view of the disclosure herein that aspects of the present disclosure can extend to any number of devices and uses. For instance, media players need not be customized for use with a particular docking station, communication network, ecosystem, and the like. In one embodiment, for instance, a media player may include a general or special use personal electronic device such as a tablet computing device, smart phone, e-reader, personal gaming device, and the like. Such devices may include input and/or output capabilities that allow the devices to be coupled to a docking station using a physical or wireless connection. A docking station may include, for instance, multiple wired or other connectors that are configured for uses with different devices. Such connectors can include standard or proprietary controllers for different personal electronic devices that may be used. When connected, a docking station or server or other device optionally authenticates the device, and may push or otherwise update application or content information on the media device. Such applications and content may enable different communication, entertainment, or other features while the wired or wireless connection is present. Such information may be sent for storage on the personal electronic device that operates as a media player, may be streamed to the device, or may be otherwise provided. Thus, while example docking stations described herein may be configured for use with a specific type of device, other docking stations may be generally provided for use with a variety of different types, makes, brands, or other devices.

Regardless of the particular shape, configuration, or other features of a media player, such media player may be utilized in accordance with embodiments of the present disclosure. For instance, such embodiments may include media players utilized as stand-alone devices, as docked or embedded devices, as networked devices, or as a combination of the foregoing. Accordingly, although FIGS. 11 and 12, and the discussion related thereto, illustrate media players as being in a docked configuration, such disclosure should not limit devices of the present disclosure to include only docked, embedded, or semi-embedded systems.

Figure 11:
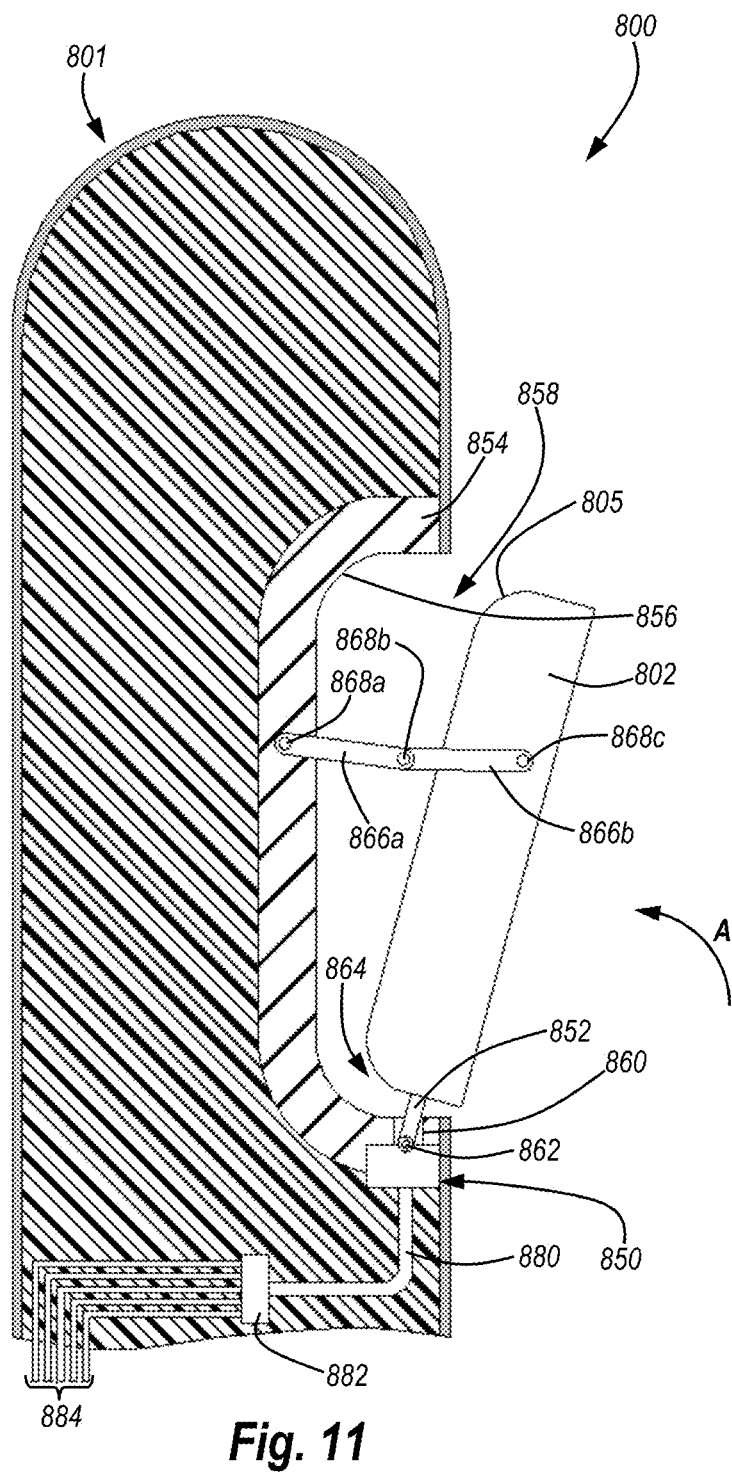
FIG. 11 is a partial cross-sectional side view of a media player connected to a docking station at a first floating position.

More particularly, FIG. 11 illustrates a partial cross-sectional side view of an embodiment of a media player docking system 800 in which a media player 802 may be installed within a receiving area of a docking station 850. As the media player 802 is moved towards the docking station 850, a docking port (see, e.g., FIG. 8) of the media player 802 may be brought into contact with, or otherwise engage, an input/output port 852 which operates as a connector of the docking station 850. The docking station 850 of the illustrated embodiment includes a mounting pan 854 that is situated within a structure 801 that may be a seatback, armrest, bulkhead, wall mount, or other structure of an aircraft, vehicle, building, or other structure. Once the media player 802 is connected to the input/output port 852, the media player 802 may be moved towards the docking station 850, approximately in the direction indicated by the Arrow A. As such movement occurs, one or more guiding surfaces 856 of the mounting pan 854 of the docking station 850 and complementary guiding surfaces 805 of the media device 802 can guide movement of the media player 802 into a proper location within the mounting pan 854 (see FIG. 12).

In the illustrated embodiment, the guiding surfaces 856 are interior, concave surfaces of the mounting pan 854, and are shown as surfaces having a curved profile with a generally constant radius. In other embodiments, however, the guiding surfaces 856 may have a beveled, angled, complex curved, or other surface useful for guiding the media player 802 into a receptacle 858 formed by the mounting pan 854. Thus, the guiding surfaces 856 may be planar, curved, interlocking or otherwise structured. In some embodiments, the guiding surfaces 856 may include rollers, rails, tracks, guides, pins, or other means for guiding the media player 802 into a docked position within the mounting pan 854 of the docking station 850. As the guiding surfaces 856 may take any number of different forms, the exterior, convex guiding surface 805 may also vary inform. Indeed, such surface may also be varied and beveled, angled, curved, interlocking, or otherwise configured. The receptacle 858 is, however, merely an example of one mechanism for securing the media player 802 relative to the docking station 802. In other embodiments, a docking station may not provide a mounting pan or similar structure with an interior cavity or other structure that receives all or a portion of the media player 802. For instance, an arm rest of an aircraft may use a mounting plate to which the media player 802 attaches. Such attachment may be permanent or temporary as described herein. In one embodiment, the attachment is using a quick release latch that can allow the media player 802 to be attached without a specific tool or key. Release of the media player 802 could be performed without a key, or may require a key as described herein that may not be readily available to an end-user of the media player 802.

Once docked to a docking station of any suitable mechanical or other form, the media player 802 can communicate with the docking station 850 and receive or provide power, communications, or other resources while operating. For instance, persona information may be exchanged to allow the media player 802 to determine what content is permitted to be accessed. In some embodiments, the docking station 850 provides a cable-less connector—such as port 852—between the media player 802 and the docking station 850. The docking station 850 may be coupled to a cable 880 extending to other systems or components (e.g., power supply, audio system, network communication, public address system, head end server, etc.); however, no cable may in some embodiments be positioned between the media player 802 and the input/output port 852 or docking station 850. In some embodiments, the cable 880 may include or be coupled to a splitter 882 that splits outputs from the docking station 850 into one or more system links 884. The splitter 882 may, in some embodiments, also act as a combination module that combines inputs received over the links 884 so as to provide an input to the docking station 850.

Figure 12:
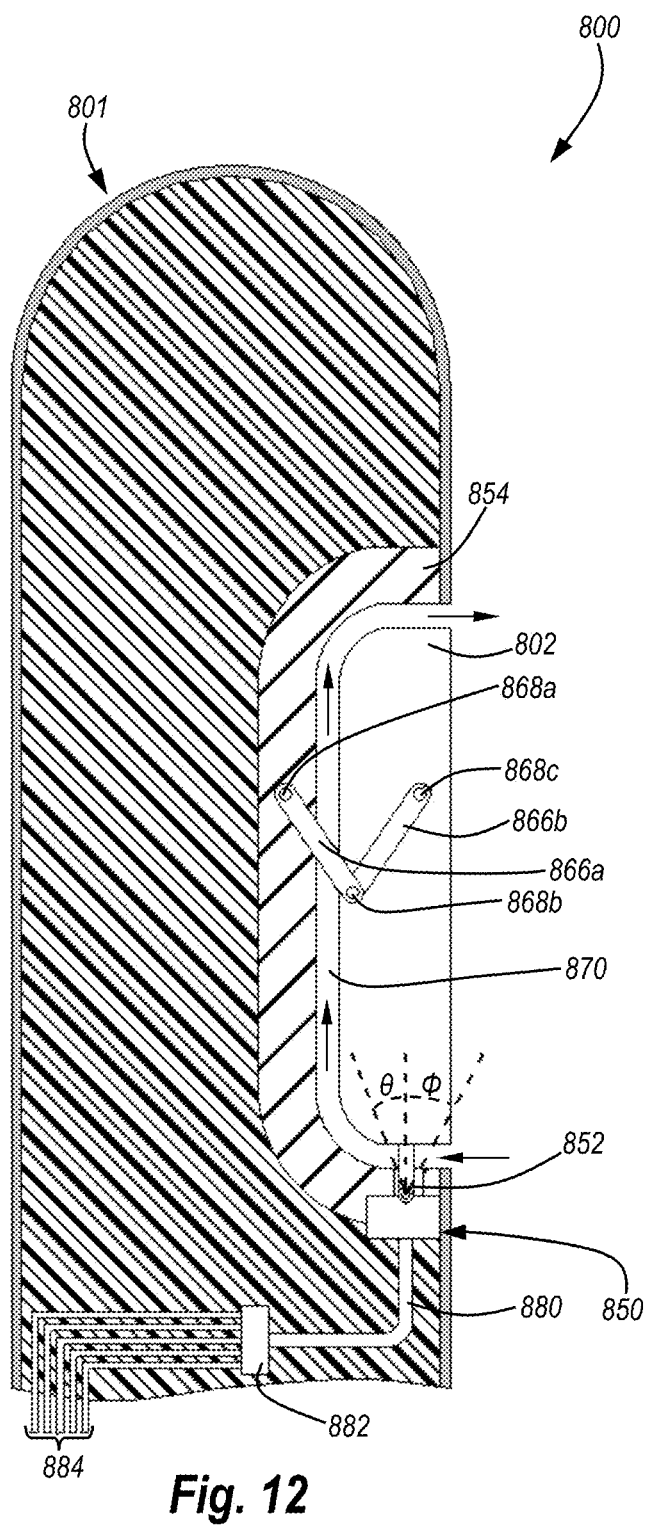
FIG. 12 is a partial cross-sectional side view of the media player of FIG. 9 connected to a docking station at a second floating position.

As shown in FIGS. 11 and 12, the media player 802 may be installed and used at any number of different angles. For instance, the guiding surfaces 805, 856 may provide flexibility with respect to an angle at which the media player 802 is installed or positioned. Moreover, in the illustrated embodiment, the docking station 850 may further facilitate changing the media player 802 between various angles. For instance, the mounting pan 854 is illustrated as including a channel 860 into which at least a portion of the input/output port 852 extends. The channel 860 is optionally oversized relative to the input/output port 852, thereby allowing the input/output port 852 to move within the channel 860. The input/output port 852 may move laterally within a constrained region (e.g., within the channel 860) or may, as shown in the illustrated embodiment, pivot within the constrained region. More particularly, the input/output port 852 may include a pivot 862 such as a hinge, ball and socket, pin, or the like. Such pivot 862 may allow the input/output port 852 to at least partially rotate within the channel 860.

Movement of the connector within the channel 860 thus provides the ability to position the media player 802 at a wide variety of locations, angled orientations, or the like during docking. Indeed, in some embodiments, the media player 802 may be positioned within the receptacle 858 by, for instance, using the guiding surfaces 805, 856, and thereafter connected to the input/output port 852. Providing for a wide variation in the angle during installation or use can ensure that the media player 802 may be docked with ease, particularly in environments in which space constraints are considerable. For instance, in an aircraft environment, a flight attendant can easily remove a media player 802 and install a new media player 802 by sliding and/or tilting the media player 802 within the receptacle 858. FIG. 12 illustrates that the range of tilt may be considerable, and can include rearward tilt angles, as represented by angle $\theta$, as well as forward tilt angles, as represented by angle $\phi$. The maximum values of angles $\theta$ and $\phi$ may be about equal or may be different. For instance, the angle $\phi$ may be as much as five degrees, although in other embodiments, the angle $\phi$ may be as much as ten, fifteen, or even thirty degrees. In still other embodiments, the angle $\phi$ may exceed thirty degrees. Similarly, the maximum value of the angle $\theta$ may be as much as about ten degrees. In other embodiments, however, the angle $\theta$ may be larger or greater than ten degrees. For instance, the angle $\theta$ may be as much as twenty or even forty-five degrees.

The guiding surfaces 805, 856 are optionally configured to ensure that the media player 802 correctly docks with the docking station 850. In at least some embodiments, the input/output port 852 and/or a corresponding connector of the media player 802 may also include guiding surfaces to facilitate a proper mating, without requiring a tool or significant time to align such connectors. The guiding surfaces of such connectors may be sized and dimensioned to allow the connectors to mate without undue lateral, axial, or rotational movement. Such may be particularly the case where one or both connectors are allowed to float in a constrained region as described above. For example, in the example shown in FIG. 12, the input/output port 852 can freely float between represented by the maximum values of angles $\theta$ and $\phi$, although lateral movement may also occur which can further increase the illustrated maximums of angle $\theta$ and/or angle $\phi$. Thus, the input/output port 852 may be allowed to float and move in exactly two directions (e.g., angularly or laterally) or even in more or less than two directions. In some embodiments, the maximum movement allowed to input/output port 852 is preferably less than about fifty percent of the minimum width of a connector's guiding surface. By floating within the constrained region, vibrational stresses on the connectors may be reduced as some play may exist between the mounting pan 854 and the input/output port 852.

When the media player 802 is docked with the docking station 850, the media player 802 is preferably supported and/or locked at a particular position or within a range of positions. In FIGS. 11 and 12, an example support structure 864 is provided to secure and selectively lock the media player 802 relative to the docking station 850. The illustrated support structure 864 may further be configured to facilitate movement of the media player 802 for installation and/or use. By way of illustration, a user in an aircraft may incline the media player 802 as shown in FIG. 11 when the user's seat is in a reclined position.

The support structure 864 of the present embodiment includes a set of linkages 866a, 866b secured to the media player 802 and the docking station 850. More particularly, a first linkage 866a may connect to the mounting pan 854 at a first pivot point 868a. At the first pivot point 868a, the first linkage 868a may rotate. The first linkage 866a connects to a second linkage 866b at a second pivot point 868b, while a second end of the linkage 866b connects to the housing of the media player 802 at a third pivot point 868c. As can be seen in FIGS. 11 and 12, as the media player 802 moves (e.g., by inclining relative to the mounting pan 854), each of the linkages 866a, 866b may pivot about the pivots 868a-c. In an upright position such as that illustrated in FIG. 12, for instance, the linkages 866a, 866b may generally form a V-shape inasmuch as the distance between pivots 868a, 868c is small relative to the same distance in FIG. 11. In contrast, in FIG. 11, the linkages 866a, 866b may approach collinear as the distance between pivots 868a, 868c increases. In either position, or any other position, the distance between the pivot point 868b may remain constant relative to pivots 868a, 868c, although the position of pivot point 868b relative to the mounting pan 864 and/or the media player 802 may vary.

The pivots 868a-c may take any number of forms, including hinge pins, ball-and-socket, or any other suitable structure. In some embodiments, a pin, ball, or other protruding structure may be located on a linkage 866a, 866b, while a corresponding channel, detent, or other structure is located on the corresponding mounting pan 864 or housing of the media player 802. In other embodiments, a protrusion may extend from the mounting pan 864 and/or media player 802 while a detent, socket, channel, or other structure is located on the linkage 866a, 866b.

According to some embodiments, the support structure 864 is configured to securely lock or attach the media player 802 to the docking station 850 during installation and use of the media player, as well as in the event of an impact. Accordingly, the support structure 864 may prevent or reduce the chance that the media player 802 falls to a floor or disconnects from the docking station 850 in an emergency. For instance, the support structure 864 may retain the media player 802 local to the docking station 850 under impacts as large as 10Gs, or even as large as 15 or 20 Gs. The support structure 864 may also take other forms. For instance, the support and/or locking structure 864 may include rods, rings, tethers, bolts, hooks, latches, screws, or other locking means that keeps player from falling during or after an impact or vibrational event.

Example media players described herein may be fungible or swappable, or otherwise configured to be selectively removed from a docking station. For instance, media players may be removed to repair devices, to update content or software of such devices, to recharge batteries, to extract payment information, or for any number of reasons. Accordingly, the support structure 864 may be selectively releasable. In accordance with one embodiment, the support structure 864 can be selectively disengaged using a key or other specialized tool. A mechanical key may be used. For instance, in some embodiments, the pivot point 868c may include a spring or other biasing mechanism, and a mechanical key may counter the biasing mechanism to release a pin or other protrusion. Other types of mechanical keys may also be used. In other embodiments, non-mechanical keys may be utilized. Such keys may include magnetic, RFID, key fob, wireless protocol (e.g., Bluetooth, Wireless USB, Zigbee, Wibree, Z-Wave, UWB, etc), remote, or other keys. It is also contemplated that the docking station 850 can provide key authentication or authorization via communication with a distal server. For example, when a non-mechanical key is within proximity of the docking station 850, the docking station 850 can read a key-ID from the key (e.g., using Bluetooth or RFID). The key-ID can be sent to a head unit server for verification that the key is authorized to release support structure 864. Authorization can restricted to location, time, personnel, or other desirable parameters.

While in some embodiments a key or other device usable to un-dock a media player may be restricted to use by administrative, repair, or other personnel (e.g., aircraft flight attendances, cleaning crew, repair technicians, etc.), such use is merely exemplary. For instance, the support structure 864 may be configured to allow an end user, such as a passenger, to easily remove or undock the media player 802 from the docking station 850, including the port 852 and/or the mounting pan 854. Such undocking may occur using a key, or even using a keyless mechanism. Each media player 802 may, for instance, include a release button that, when selected, retracts a pin connected at the pivot point 868c, thereby releasing the media player 802 from the support structure 864. Such a button or other mechanism may also optionally release the media player 802 from a connection with the port 852. Once released, the media player 802 may continue operation or may be powered off. For instance, where the media player 802 includes a power source such as a battery, the battery may continue to power the device and allow its use as a portable, self-contained device. Power may alternatively or additionally be received from other sources. For instance, a power input may be provided on the media player 802 so that a direct current or other power source can power the media player 802. In some cases, the docking station 850 may include a power input that can connect to the media player 802 while the media player is in a docked state (e.g., connected to port 852) or an undocked state (e.g., disconnected from port 852).

The support structure 864 is merely one example embodiment of a support or locking structure, and other hinging, rotating, linear, or other systems may be used. Similarly, the port 852 is merely one example of a docking connector, and any other suitable mechanical, electrical, or other solution may be utilized. Thus, the support structure 864 and/or the connector 852 may be located in any of a number of different locations relative to the docking station 850 and/or the media player 802 may utilize different connection mechanisms, and the like. Regardless of the particular mechanism for supporting, docking, or locking the media player 802 relative to the docking station 850, the support structure 864 and/or the connector 852 are optionally hidden from view to reduce the risk that they are tampered with. For instance, a mechanical opening may be provided through a vent in a single exposed surface of the media player 802. Alternatively, a wireless connector may allow the support structure 864 to be embedded within the media player 802 or docking station 850 and remain out of view. In some embodiments, the connector is only required to release the media player 802 from a docked position. Once released, the media player 802 can be safely removed. When a new player is docked, the support structure 864 can re-engage the newly docked media player 802 automatically without requiring the use of the key to secure the media player 802 in place. While optional, such configuration may reduce the difficulty or time to install a media player 802.

The embodiment of the docking system 800 illustrated in FIGS. 11 and 12 is suitable for use with a seatback of an aircraft IFE, a bulkhead, a car navigation interface, or other docking station location that substantially encloses media player 802. The guiding surfaces of the media player 802 and the docking station 850 can further operate as ducting surfaces. More particularly, surfaces 805, 856 may operate as ducting surfaces that cooperate to form a plenum 870, which in turn provides for cooling airflow. Such airflow may be passive or may be a forced airflow. In at least one embodiment, airflow originates with cool air flowing into the plenum at a first vent (e.g., near the bottom of mounting pan 854). Airflow can circulate through plenum 870 providing cooling to the back and/or side surfaces of the media player 802 and then exit the plenum 870 at a heated air vent (e.g., near the top of the mounting pan 854). The plenum 870 may be substantially open, or may be at least partially closed in some embodiments. For instance, one or more bezels may overlap adjacent surfaces and include vent openings the allow airflow through corresponding vents.

If passive airflow is provided, the ducting surfaces 805, 856 may reduce requirements for active cooling elements. Alternatively, or in addition, one or more heat sinks or other cooling components could be provided on the media player 802 and/or docking system 850. Such cooling components may enhance cooling of the media player and can extend into the plenum 870, if desired. Fans or other powered cooling assemblies are optional, and when included may increase weight and power consumption, but may provide enhanced cooling properties.

It should be appreciated in view of the disclosure herein that a media player may be utilized in any number of different environments. In some embodiments, there may be vibrational stresses that wear on the media player, while in other embodiments there may be concerns with dust or other particles. The plenum 870 may be at least partially closed to account for such conditions. For instance, in a dusty or dirty environment, a jacket may cover all or a portion of the vents to the plenum 870 to reduce the exposure of the media player 802 to dust. In other embodiments, cushioned pads may be positioned in the plenum 870 and maintain a media player 802 in an installed position that is vibrationally isolated. Example pads may be formed of suitable materials such as silicone rubber, foam, or other materials that elastically absorb or distribute vibrations. In some embodiments, pads may be included and sized to allow airflow to continue within at least a portion of the plenum 870, and through the corresponding vents.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the disclosure may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A universal docking system, comprising:
   a plurality of media player docking stations, wherein said plurality of media player docking stations are each configured to receive any one media player from a plurality of swappable media players, the plurality of swappable media players being configured for use as stand alone devices and as embedded devices within the plurality of media player docking stations; and
   a structure having an interior portion, wherein said plurality of media player docking stations are installed at a plurality of docking station locations in said structure,
   wherein at least some of said plurality of docking stations are locally encoded with media player persona information that depends on said at least some of said plurality of docking stations' locations,
   wherein said at least some of said plurality of docking stations are configured to transfer said persona information to installed media players, where said persona information is configured to instruct said installed media players of their functional role at a corresponding receiving docking station location.

2. The universal docking system of claim 1, wherein said plurality of media players are fungible.

3. The universal docking system of claim 1, wherein said interior portion of said structure comprises a cabin of a vehicle.

4. The universal docking system of claim 3, wherein said vehicle comprises an aircraft.

5. The universal docking system of claim 1, wherein said plurality of media players are configured to use said persona information to restrict content from being provided to a user by docked media players at a receiving docking station's location.

6. The universal docking system of claim 1, wherein one of more of said plurality of docking stations are configured to receive a corresponding one of said plurality of media players via guiding surfaces of said one or more docking stations and guiding surfaces of said corresponding media players.

7. The universal docking system of claim 1, wherein said plurality of docking stations are configured to mate with said media players via a cable-less connector.

8. The universal docking system of claim 7, wherein said cable-less connector is configured to float within a constrained region.

9. The universal docking system of claim 8, wherein said plurality of docking stations at least partially define said constrained region.

10. The universal docking system of claim 1, wherein said plurality of docking stations each comprise a first ducting surface configured to form a plenum with a second ducting surface of at least one of said plurality of media players, wherein said plenum provides for passive airflow to cool a corresponding one of said plurality of media player when only one surface of said corresponding one media player is exposed.

11. The universal docking system of claim 10, wherein said plenum is configured to vent heated air via a vent.

12. The universal docking system of claim 1, wherein said at least some of said plurality of docking stations comprise a swappable media player persona module storing said persona information in a computer readable memory.

13. The universal docking system of claim 1, wherein said at least some of said plurality of docking stations are physically and locally encoded with said persona information.

14. The universal docking system of claim 1, wherein said plurality of docking stations are configured to receive and to lock said plurality of media players in a docked position without requiring use of a tool to dock and lock said plurality of media players.

15. The universal docking system of claim 14, wherein said docking stations comprise a media player lock configured to releasably lock a corresponding one of said plurality of media players in an installed position, and are configured to release said corresponding one media player through use of a key.

16. A universal docking system, comprising:
   a plurality of swappable media players, each of the plurality of swappable media players being configured for use as a stand-alone device;

a plurality of docking stations, wherein each of said plurality of docking station is configured to receive any one of said plurality of swappable media players for use of the plurality of swappable media players as embedded devices; and a structure having an interior portion in which said plurality of docking stations are installed at a plurality of docking station locations, wherein at least some of said plurality of docking stations comprise a first ducting surface configured to form a plenum with a second ducting surface of said plurality of swappable media players, wherein said plenum provides for a passive airflow to cool said plurality of swappable media players when only one surface of said plurality of swappable media players is exposed.

17. The universal docking system recited in claim 16, wherein each of said plurality of swappable media players may be docked at any of said plurality of docking stations.

18. The universal docking system recited in claim 16, wherein at least one of said plurality of swappable media players includes a touch-sensitive display and a separate cursor control.

19. The universal docking system recited in claim 16, wherein at least one of said plurality of swappable media players includes a display having a diagonal size between about seven inches and about ten inches.

20. The universal docking system recited in claim 16, wherein at least one of said plurality of swappable media players includes:

a removable battery supplying power to said at least one swappable media player while docked at a corresponding one of said plurality of docking stations, said removably battery including an external charge indicator thereon, and removable therewith;

an input/output docking connector separate from a touch sensitive display and configured to connect to a connector of said corresponding one of said plurality of docking stations, said input/output docking connector including a plurality of distinct communication protocols, said plurality of distinct communication protocols including at least four of a group that includes audio out, video out, Ethernet, I2C, input discrete, power out, and USB;

a plurality of input controls, said plurality of input controls including at least two movement and selection controls, said at least two movement and selection controls including at least the touch sensitive display and movement and control interfaces separate from said touch sensitive display; and a payment interface configured to read credit card information and at least temporarily store said credit card information.

21. The universal docking system recited in claim 20, wherein said input/output docking connector includes a power out configured to power a corresponding one of the docking stations.

22. A universal docking system, comprising:

a plurality of media player docking stations each configured to receive any one media player from a plurality of swappable media players, the plurality of swappable media players being configured for both stand-alone and embedded use; and a structure having an interior portion, said plurality of media player docking stations being installed at a plurality of docking station locations within said interior portion of the structure, wherein at least some of said plurality of media player docking stations are configured to mate with a corresponding one media player via a cable-less connector configured to float within a constrained region provided by at least one of said docking station or said media player.

23. The universal docking station recited in claim 20, wherein the payment interface is configured to read the credit card information directly from a credit card and store the credit card information for retrieval following completion of an airline flight.

* * * * *